US011855931B2

(12) United States Patent
Oteri et al.

(10) Patent No.: US 11,855,931 B2
(45) Date of Patent: *Dec. 26, 2023

(54) CHANNEL ACCESS SCHEMES FOR WIRELESS LOCAL AREA NETWORK (WLAN) WITH FULL-DUPLEX RADIOS

(71) Applicant: INTERDIGITAL PATENT HOLDINGS, INC., Wilmington, DE (US)

(72) Inventors: Oghenekome Oteri, San Diego, CA (US); Hanqing Lou, Syosset, NY (US); Li Hsiang Sun, San Diego, CA (US); Alphan Sahin, Westbury, NY (US); Robert L. Olesen, Huntington, NY (US); Xiaofei Wang, North Caldwell, NJ (US); Rui Yang, Greenlawn, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,978

(22) Filed: Dec. 6, 2022

(65) Prior Publication Data

US 2023/0095822 A1 Mar. 30, 2023

Related U.S. Application Data

(63) Continuation of application No. 17/052,315, filed as application No. PCT/US2019/030429 on May 2, 2019, now Pat. No. 11,522,667.

(Continued)

(51) Int. Cl.
*H04W 72/12* (2023.01)
*H04W 84/12* (2009.01)
(Continued)

(52) U.S. Cl.
CPC ............... *H04L 5/14* (2013.01); *H04W 72/12* (2013.01); *H04W 74/0816* (2013.01); *H04W 84/12* (2013.01)

(58) Field of Classification Search
CPC ........ H04W 84/12; H04W 72/12; H04W 5/14
(Continued)

(56) References Cited

U.S. PATENT DOCUMENTS

2009/0028074 A1 1/2009 Knox
2016/0380746 A1 12/2016 Min et al.
(Continued)

FOREIGN PATENT DOCUMENTS

EP 3 188 429 7/2017

OTHER PUBLICATIONS

Banerjea et al., "A Simplified Simultaneous Transmit and Receive MAC Proposal," IEEE 802.11-14/0340-00hew (Mar. 17, 2014).
(Continued)

*Primary Examiner* — Angel T Brockman
(74) *Attorney, Agent, or Firm* — Volpe Koenig

(57) ABSTRACT

Methods and apparatuses are described herein for multiple access schemes for Wireless Local Area Network (WLAN) with full-duplex radios. For example, an access point (AP), in response to receiving a request to send (RTS) from a first station (STA), may transmit a full-duplex clear to send (FD CTS) to the first STA and a full-duplex request to send (FD RTS) to a second STA. In response to transmitting the FD RTS to the second STA, the AP may receive a clear to send (CTS) from the second STA. The AP may transmit, to both the first STA and the second STA, a FD trigger frame that includes scheduling information to enables FD communication with the first STA for uplink (UL) data and the second STA for downlink (DL) data at a same time. The scheduling (Continued)

information may include timing information and channel information for the FD communication.

8 Claims, 23 Drawing Sheets

Related U.S. Application Data

(60) Provisional application No. 62/666,466, filed on May 3, 2018.

(51) Int. Cl.
*H04W 74/08* (2009.01)
*H04L 5/14* (2006.01)
*H04L 5/04* (2006.01)

(58) Field of Classification Search
USPC .......................................................... 370/277
See application file for complete search history.

(56) References Cited

U.S. PATENT DOCUMENTS

2017/0127453 A1* 5/2017 Adachi ..................... H04L 1/00
2021/0176033 A1* 6/2021 Oteri .................... H04W 72/12

OTHER PUBLICATIONS

Bharadia et al., "Full Duplex Radios," SIGCOMM (Aug. 12-16, 2013).
Bian et al., "Co-time Co-frequency Full Duplex for 802.11 WLAN," IEEE 802.11-13/0765r2 (Jul. 17, 2013).
Bourdoux et al., "Full-duplex Technology for HEW," IEEE 11-13/0764r1 (Jul. 14, 2013).
Cheng et al., "RTS/FCTS Mechanism Based Full-Duplex MAC Protocol for Wireless Networks," IEEE GlobeCom Workshops, pp. 5017-5022 (Dec. 9, 2013).
Duarte et al., "Design and Characterization of a Full-duplex Multiantenna System for WiFi networks," arXiv:1210.1639 (Oct. 2012).
Gilb et al., "802.11 Full Duplex," IEEE 802.11-18/0191r0 (Jan. 15, 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless Lan Medium Access Control (MAC) and Physical Layer (PHY) Specifications; Amendment 2: Sub 1 GHz License Exempt Operation, IEEE 802.11ah-2016 (Dec. 7, 2016).
Jain et al., "Practical, Real-time, Full Duplex Wireless," MobiCom (Sep. 19-23, 2011).
Kim et al., "Janus: A Novel MAC Protocol for Full Duplex Radio," CSTR Feb. 2013 (Jul. 23, 2013).
Levis, "STR Radios and STR Media Access," IEEE 802.11-13/1421r1 (Nov. 12, 2013).
Oteri et al., "FD Architecture in 802.11," IEEE 802.11-18/1224r1 (Jul. 5, 2018).
Oteri et al., "Technical Report on Full Duplex for 802.11—FD Architecture," 802.11/18-1225r1 (Jul. 2018).
Singh et al., "Efficient and Fair MAC for Wireless Networks with Self-Interference Cancellation," International Symposium of Modeling and Optimization of Mobile, Ad Hoc, and Wireless Networks, pp. 94-101 (May 2011).
Srinivasan et al., "Beyond Full Duplex Wireless," Asilomar Conference on Signals, Systems and Computers (Nov. 2012).
Taori et al., "Considerations for In-Band Simultaneous Transmit and Receive (STR) feature in HEW," IEEE 11-13/1122r1 (Sep. 16, 2013).
Thilina et al., "Medium Access Control Design for Full Duplex Wireless Systems: Challenges and Approaches," IEEE Communication Magazine, vol. 53, No. 5 (May 1, 2015).
Xin et al., "Technical Report on Full Duplex for 802.11," IEEE 802.11/18-0498r8 (Sep. 14, 2018).

* cited by examiner

Figures 7A, 7B, 7C, 7D:
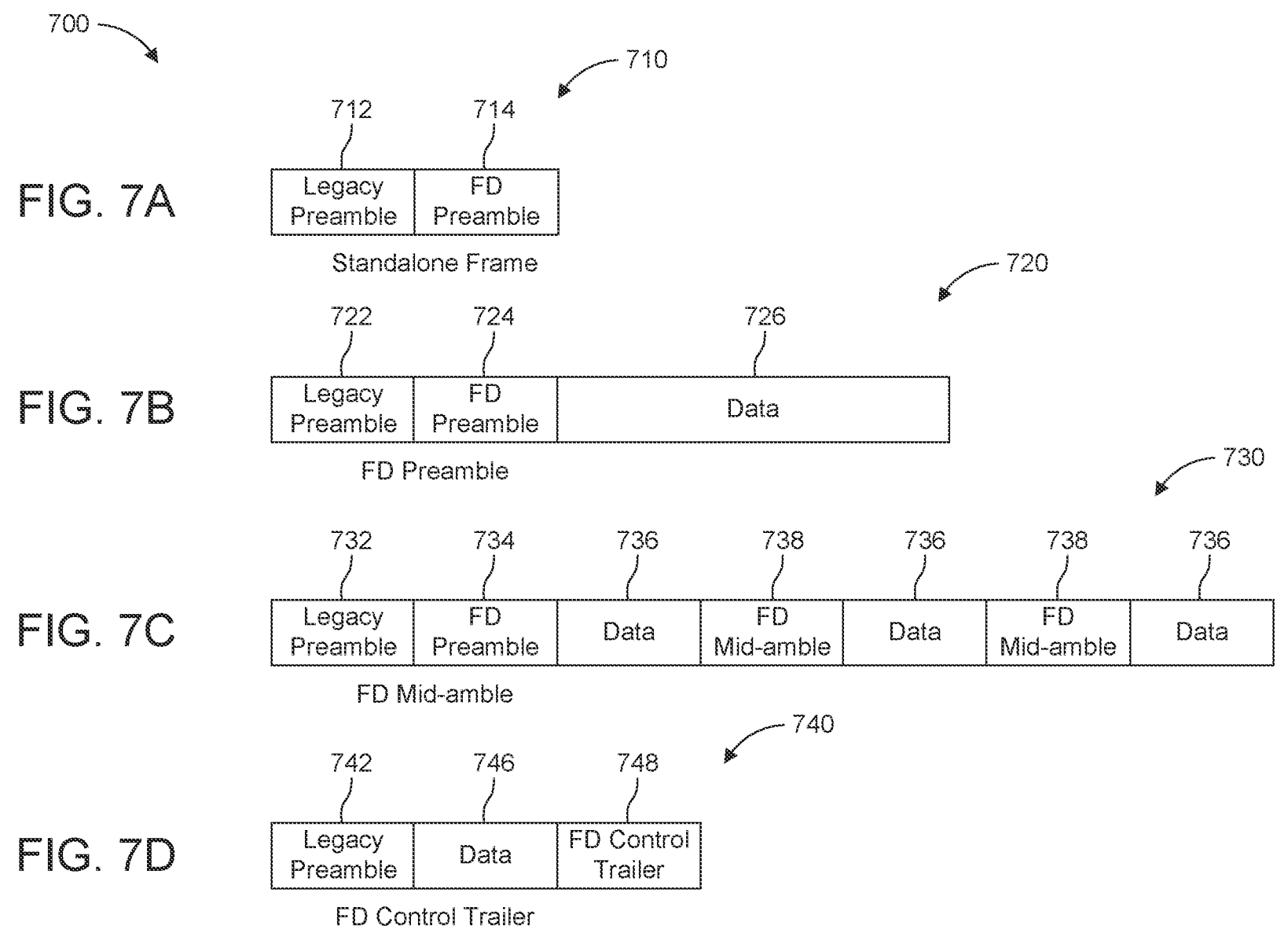

| 712 | 714 |
|---|---|
| Legacy Preamble | FD Preamble |

Standalone Frame

| 722 | 724 | 726 |
|---|---|---|
| Legacy Preamble | FD Preamble | Data |

FD Preamble

| 732 | 734 | 736 | 738 | 736 | 738 | 736 |
|---|---|---|---|---|---|---|
| Legacy Preamble | FD Preamble | Data | FD Mid-amble | Data | FD Mid-amble | Data |

FD Mid-amble

| 742 | 746 | 748 |
|---|---|---|
| Legacy Preamble | Data | FD Control Trailer |

FD Control Trailer

700

CHANNEL ACCESS SCHEMES FOR WIRELESS LOCAL AREA NETWORK (WLAN) WITH FULL-DUPLEX RADIOS

CROSS REFERENCE TO RELATED APPLICATION

This application is a continuation of U.S. patent application Ser. No. 17/052,315 filed on Nov. 2, 2020 and issued as U.S. Pat. No. 11,522,667 on Dec. 6, 2022, which is a continuation of the U.S. National Stage, under 35 U.S.C. § 371, of International Application No. PCT/US2019/030429 filed May 2, 2019, which claims the benefit of U.S. Provisional Application No. 62/666,466, filed on May 3, 2018, the contents of which are hereby incorporated by reference herein.

BACKGROUND

Advances in self-interference cancellation have led to the feasibility of full-duplex wireless (FDW) communications at the physical layer. However, conventional carrier sense mechanisms may not allow multiple stations (STAs) to access a contention based wireless medium simultaneously. For example, carrier sensing in the uplink/downlink will detect energy in the channel when a STA is transmitting in the downlink/uplink, which will prevent the system from full-duplex operation. Thus, channel access schemes that enable multiple STAs to access the medium with full-duplex radios are needed.

SUMMARY

Methods and apparatuses are described herein for multiple access schemes for Wireless Local Area Networks (WLANs) with full-duplex radios. For example, an access point (AP), in response to receiving a request to send (RTS) frame from a first station (STA), may transmit a full-duplex clear to send (FD CTS) frame to the first STA and a full-duplex request to send (FD RTS) frame to a second STA. In response to transmitting the FD RTS frame to the second STA, the AP may receive a clear to send (CTS) frame from the second STA. Based on the received RTS frame, the AP may determine that the first STA will transmit UL data to the AP. Similarly, based on the received CTS frame, the AP may determine that the second STA will receive DL data from the AP. The AP may transmit a FD preamble to perform FD filter estimation. Using the FD filter estimation, the AP may perform the FD communication with the first STA for the UL data and the second STA for the DL data. Specifically, the AP may transmit, to both the first STA and the second STA, a full-duplex (FD) trigger frame that includes scheduling information to enable FD communication with the first STA for uplink (UL) data and the second STA for downlink (DL) data at a same time. The scheduling information in the FD trigger frame may include timing information and channel information for the FD communication. The FD trigger fame may be aggregated with at least one of a legacy preamble, a FD preamble, or UL/DL data. Based on the scheduling information, the AP may receive the UL data from the first STA while simultaneously transmitting DL data to the second STA.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 7A is a diagram illustrating an example frame structure for full-duplex training as a standalone frame;

FIG. 7B is a diagram illustrating another example frame structure for full-duplex training with a full-duplex preamble sent after a legacy preamble but before a data transmission;

FIG. 7C is a diagram illustrating another example frame structure for full-duplex training with mid-amble sequences transmitted at desired intervals;

FIG. 7D is a diagram illustrating another example frame structure for full-duplex training with a full-duplex control trailer;

DETAILED DESCRIPTION

Figure 1A:
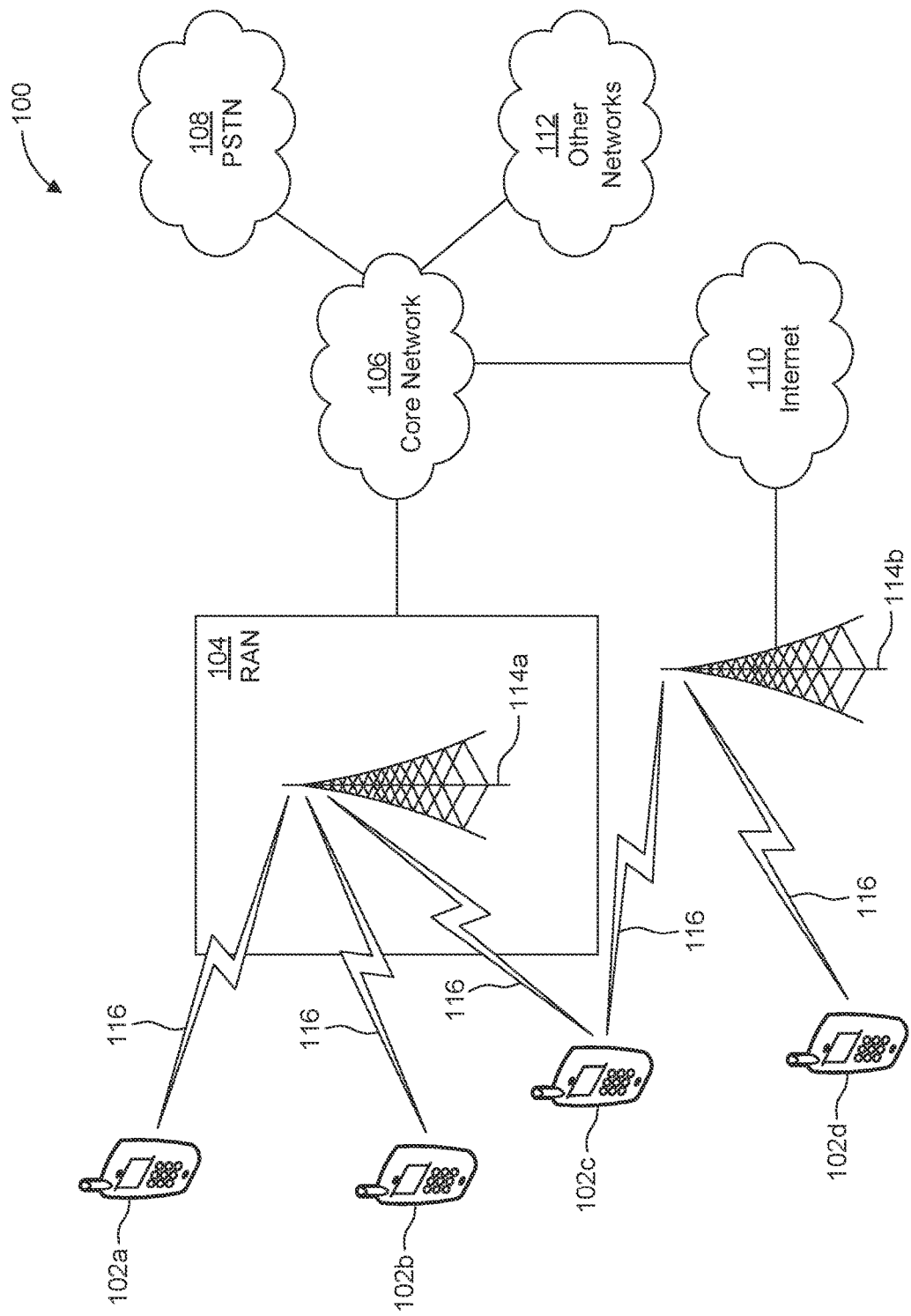
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
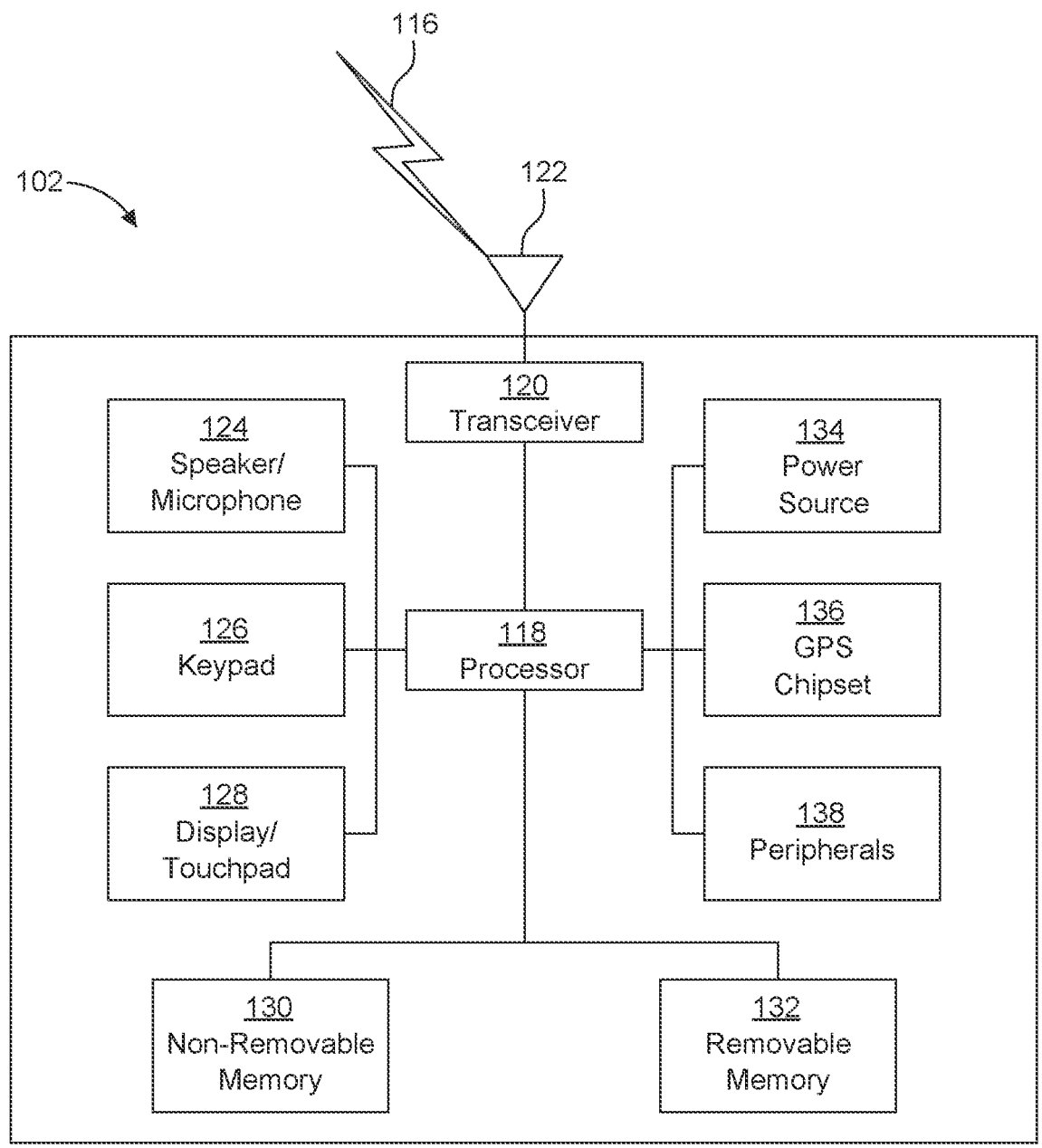
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full-duplex radio for which transmission and reception of some or all of the signals (e.g., associated with particular subframes for both the UL (e.g., for transmission) and downlink (e.g., for reception) may be concurrent and/or simultaneous. The full-duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
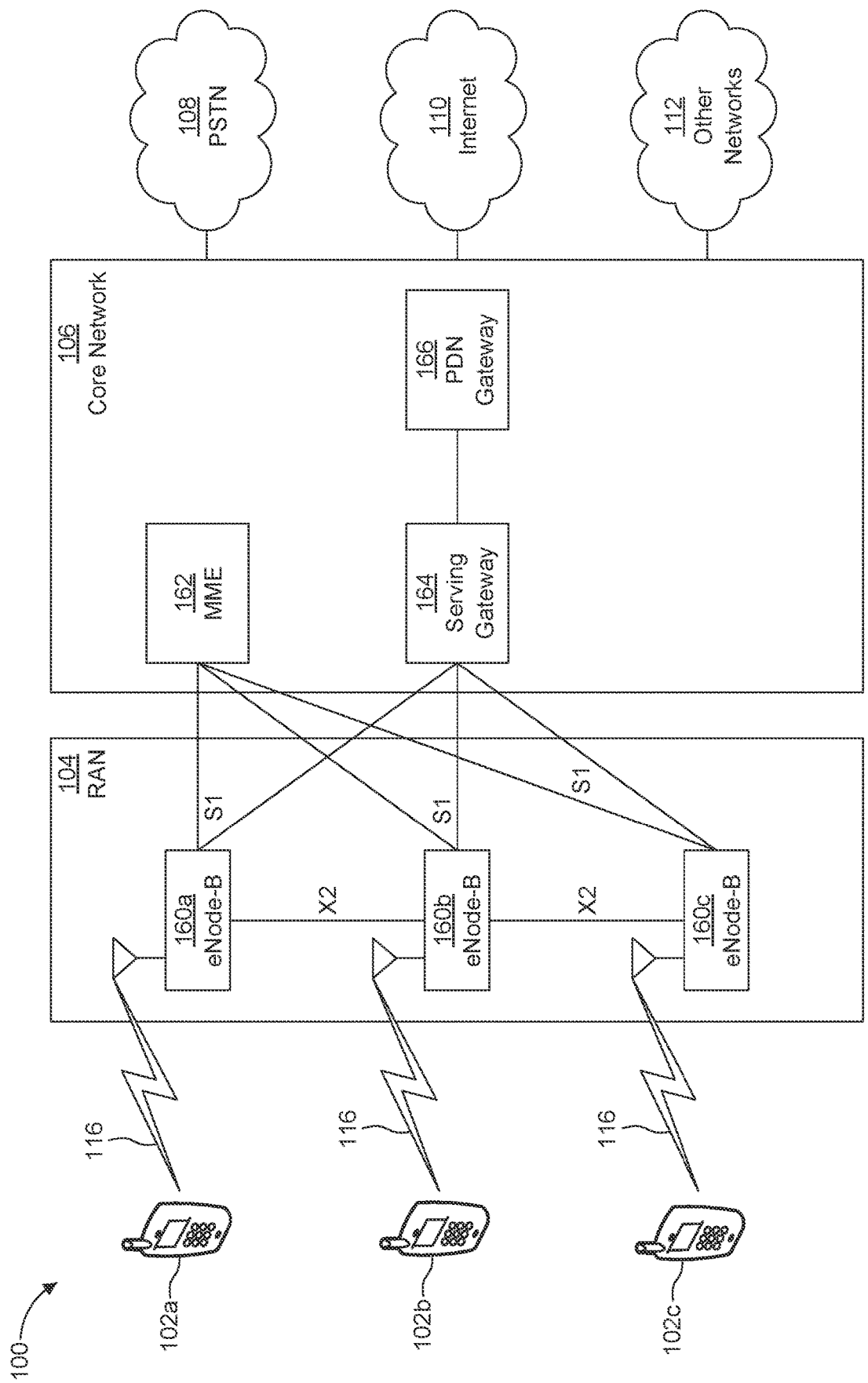
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
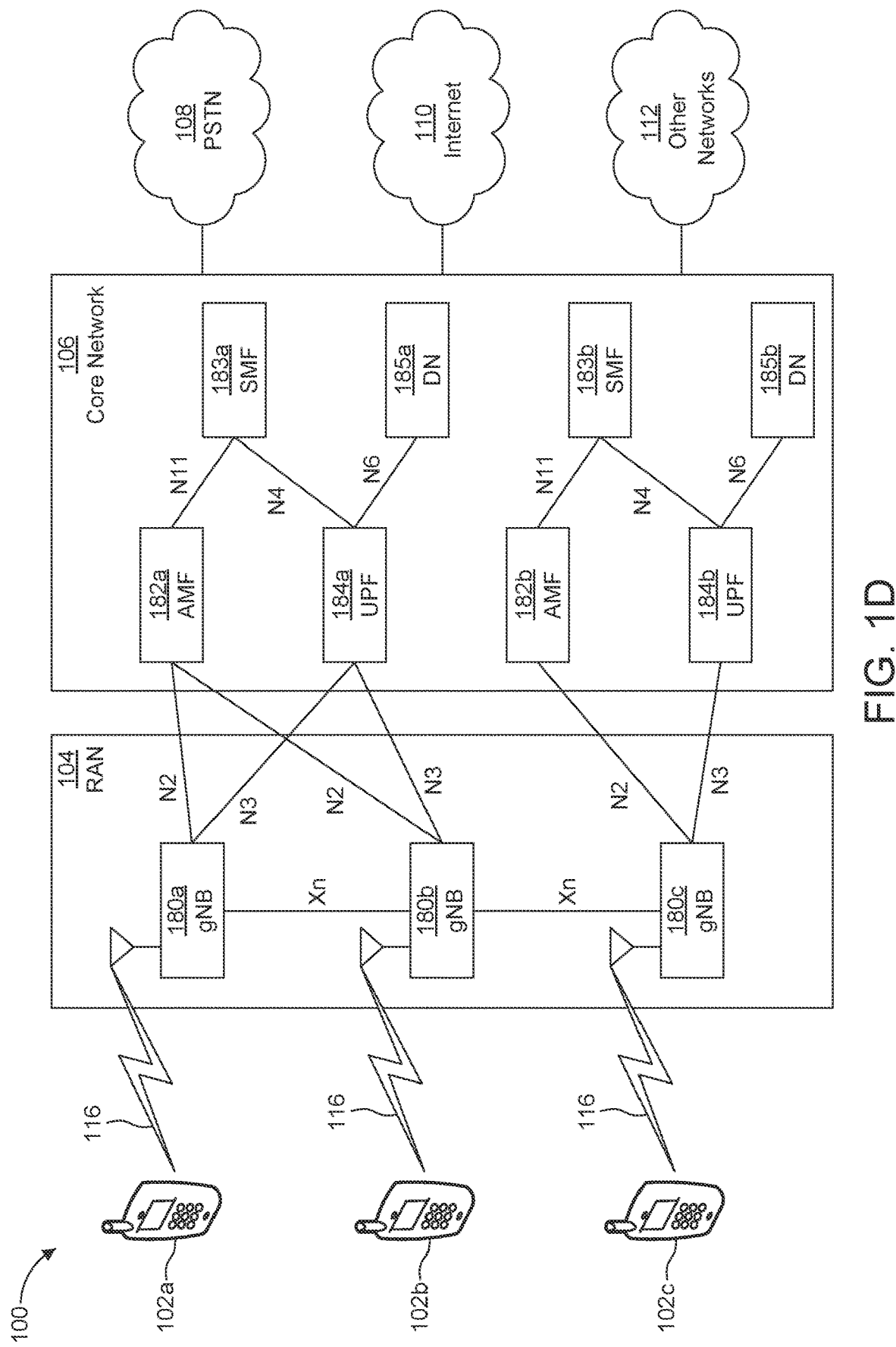
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In some circumstances, wireless communications systems may be restricted to transmissions for the downlink and associated receptions in the uplink, or visa-versa, using any combination of time/frequency/space/polarization dimensions to separate the downlink/uplink transmissions. This restriction may be imposed by the capability of radio technology, which due to limitations in isolation capabilities may necessitate that a radio on a particular frequency and band can only either transmit or receive at a particular time instant. To address this issue, Frequency Division Duplex (FDD), or Time Division Duplex (TDD) transmissions schemes wherein separation of transmitted and received signals may be used to by using either frequency or time based separation.

Figure 2:
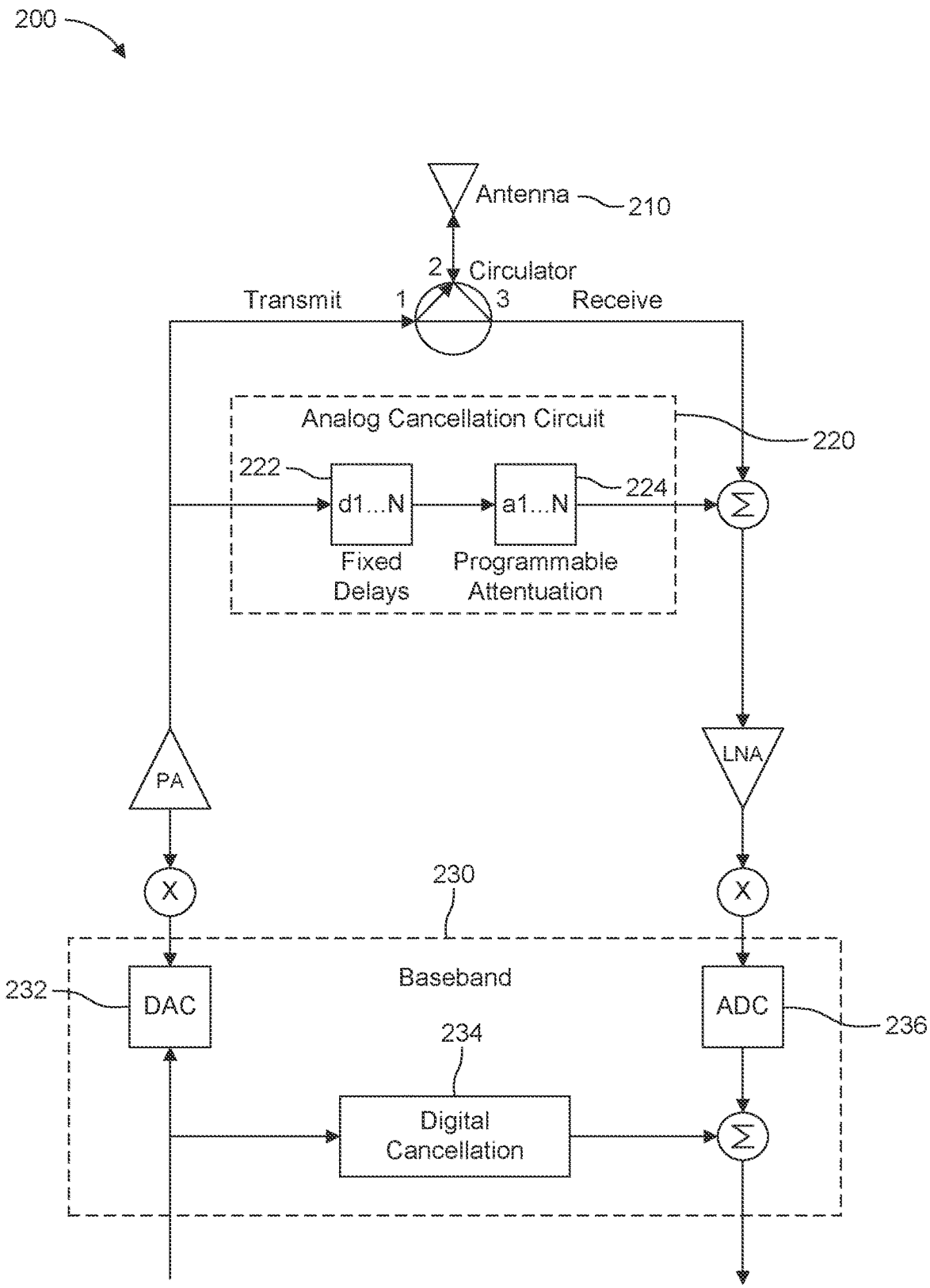
FIG. 2 is a diagram illustrating an example full-duplex transceiver (or full-duplex wireless system)

FIG. 2 illustrates an example full-duplex transceiver or full-duplex wireless system (FWS) 200, which may be used in combination with any of other embodiments described herein. As self-interference cancellation techniques advance, full-duplex at the physical layer feasibility may be seen. The example of FIG. 2 provides an overview of a typical FDW system 200, and the corresponding aspects which may enable such systems. As illustrated in FIG. 2, a FDW system 200 may comprise three functions: 1) antenna isolation, 2) analog cancellation, and 3) digital cancellation. Each of these areas may provide a specific degree of transmission and reception isolation/cancellation, and each may do so with a unique set of design constraints and limitations. Using transmit and/or receive antennas 210, antenna isolation methods may provide 25 to 40 dB of isolation between the transmit and receive signal paths. Analog cancellation may provide an additional 25 to 30 dB of isolation. For example, the analog cancellation circuit 220 may perform fixed delays 222 and programmable attenuation 224 on the analog signals to provide such isolation. Digital cancellation may provide another 10 to 25 dB of isolation. For example, the baseboard 230 may include a digital analog circuit 232 and an analog digital circuit 238, and performs digital cancellation 234 to provide such isolation. Using the combination of these methods a FDW system may provide up to 80 dB of isolation between the transmit and receive signal paths, which may be the minimum necessary for a practical FDW system.

The first step to facilitate full-duplex transmission, or simultaneous transmission and reception, may be antenna isolation of the transmit and receive antennas 210. Isolation may be accomplished using a number of different approaches including physical alignment, location, phase cancellation, and/or isolation using a circulator. Using methods such as these for antenna isolation, isolation results of approximately 30 dB may be accomplished.

Analog cancellation circuit 220 may address interference from the transmit path to the receive path through the use of a cancellation signal that is applied to the receive signal. Several methods for analog cancellation may be used, such as: use of a balun for coupling of a portion of the transmit signal, and inverted prior to cancellation in the receive path; use of an analog cancellation circuit to actively adjust the cancellation signal; and/or use of a branch line coupler to facilitate analog cancellation.

Digital cancellation 234 may be used to remove residual interference from the antenna isolation and RF cancellation stages of the transceiver. As discussed herein, digital cancellation 234 may provide 10 to 25 dB of isolation; however, this may not be sufficient without other elements of signal cancellation. Issues with achieving a higher degree of digital cancellation may be the result of quantization limitations for broadband digital converter technologies.

Digital cancellation 234 may have two components: estimating the self-interference of the received waveform; and using the channel estimate on the known transmit signal (e.g., derived from the preamble or full-duplex preamble) to generate digital reference samples for subtraction from the received signal. Given these components, the quality of digital cancellation may depend on the quality of channel estimation. If an FDW system is implemented in a WLAN system, channel estimation may be prone to interference due to STAs that cause interference during the training period of the reception. One approach to specifically use an interference-free period for channel estimation via carrier sense.

There may be more than one MAC design to support full-duplex operation in WLAN networks. For example, there may be pair-wise (symmetric) full-duplex and asymmetric full-duplex.

Figure 3:
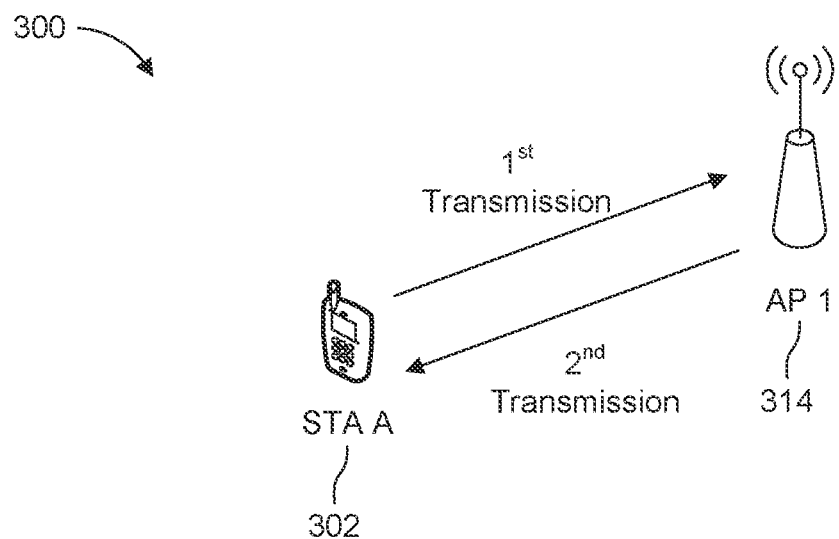
FIG. 3 is a diagram illustrating an example pair-wise (symmetric) full-duplex operation scenario.

FIG. 3 illustrates a pair-wise (symmetric) type of full-duplex operation scenario. As shown in the pair-wise full-duplex scenario there may be two nodes involved in full-duplex operation. Both nodes (AP 1 and STA A) may be full-duplex capable and may transmit and receive at the same time.

Figure 4:
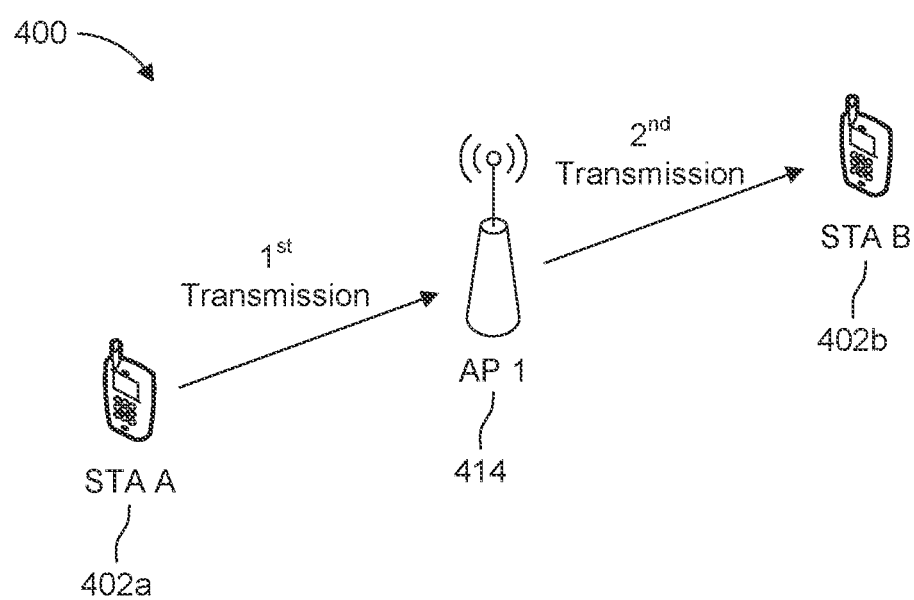
FIG. 4 is a diagram illustrating an example asymmetric full-duplex operation scenario.

FIG. 4 illustrates an asymmetric type of full-duplex operation scenario. In the asymmetric full-duplex scenario there may be three nodes involved in the full-duplex operation. Only node AP 1 may be required to be full-duplex capable since it may be the only node that is transmitting and receiving at the same time in this scenario; the other two nodes (STAs A and B) may be only half-duplex capable.

With either type of full-duplex operation scenarios, the first transmission in the full-duplex operation may be defined as the primary transmission, and the corresponding transmitter and receiver may be defined as the primary transmitter and receiver. The second transmission may be defined as the secondary transmission of the full-duplex operation, and the corresponding transmitter and receiver may be defined as the secondary transmitter and receiver. The uplink transmission may be either the primary or the secondary transmission (and vice versa).

The MAC design for full-duplex operation may include a number of parameters and specifications. In one example, the parameters and specifications may include one or more of the following: CSMA/CA-based algorithm(s); support for pair-wise and unrestricted STR scenarios; a requirement of modifying the current ACK by specifying the order of sending ACKs after full-duplex transmission; an additional feature of determining the destination of secondary transmission based on a history interfering table; an additional feature of a primary collision mechanism where secondary transmission is used as an implicit ACK; a requirement for all nodes to be STR-aware; and/or an inability to support legacy 802.11 devices.

In another example, the parameters and specifications may include one or more of the following: a focus on pair-wise STR-scenario; a requirement of modifying the current ACK by modifying the priority of sending ACKs to be a higher than waiting for ACKs; a requirement for modifying an overhearing behavior, where after one successful full-duplex transmission, every node waits for Extended Interframe Space (EIFS) to start next contention; an additional feature of pair-wise secondary transmission, where the initiation of the secondary transmission is embedded in RTS-CTS exchange; compatibility with 802.11 devices with higher contention overhead (EIFS).

In another example, the parameters and specifications may include one or more of the following: an AP-centralized algorithm(s); support for pair-wise and unrestricted scenarios; a requirement of a new centralized medium access mechanism; a requirement that all nodes be STR-aware; and/or an inability to support legacy 802.11 devices. The new centralized medium access mechanism may further include the parameters that the AP controls and is operated in a 3-step cycle, the AP collects information about data-length and interference relationships from STAs, the AP broadcasts the scheduling decision packet and initiates data transmissions, and/or the sending of ACKs in the predefined order embedded in the scheduling decision packet.

In order to utilize spectrum more efficiently, in-band full-duplex may be considered for 802.11 (e.g., 802.11ax HEW SG). Specifically, a high level design for an in-band full-duplex MAC may include the addition of an STR preamble. The STR preamble to support in-band full-duplex may further include: partial association ID (AID) in the VHT-SIGA1 that indicates a recipient(s) of a PPDU; group ID/partial AID of STA2 that indicates the STA2 should also transmit; STA2 should end PPDU transmission before L_LENGTH duration; in-band STR capable AP that can transmit and receive ACK simultaneously; and/or where STA feedbacks the status of a transmit buffer at STAs to the AP to enable scheduling of UL transmission.

In a conventional Carrier-Sense Multiple-Access with Collision Avoidance (CSMA/CA) based channel access methodology, channel access may not work well for full-duplex operation. Given that full-duplex requires that multiple STAs access the medium simultaneously, a legacy carrier sense mechanism in the uplink, or downlink, may detect energy in the channel when the downlink, or uplink, is transmitting. Therefore, a new channel access mechanism is needed to address this issue.

Figure 5:
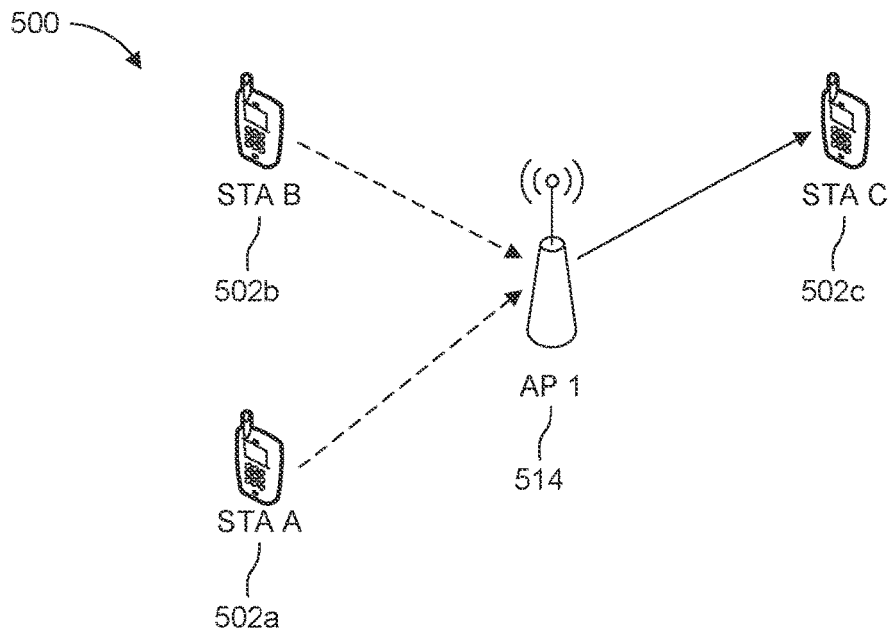
FIG. 5 is a diagram illustrating an example of a channel access issue for full-duplex operation.

FIG. 5 illustrates an example of a channel access issue 500 for full-duplex operation. As shown in the example, AP 1 514 may start transmission to STA C 502c (which is the primary transmission). Then, STAs A 502a and B 502b may both detect this primary transmission and may decide to take advantage of full-duplex operation and subsequently may desire to start a secondary transmission to AP 1 514. However, due to the on-going primary transmission (AP 1 514 to STA C 502c) on the same channel, the conventional CSMA/CA mechanisms may not work as STA C 502c occupies the medium and consequently, when STAs A 502a and B 502b perform listen before talk, they will sense the medium is busy. Additionally, STAs A 502a and B 502b cannot know if other STAs have attempted a secondary transmission to AP 1 514 as well.

In order to enable full-duplex operation in WLAN, methods and apparatuses that allow the configuration of full-duplex transmission that avoids the potential for unresolved contention of secondary transmission attempts are needed. In addition, or alternatively, methods and apparatuses for the channel access mechanism to resolve the contention of secondary transmission attempts is needed.

Also shown in the example of FIG. 5, STA A 502a may start an uplink transmission to AP 1 514 (which is the primary transmission). If AP 1 514 desires to transmit a downlink transmission to STA C 502c using full-duplex (the secondary transmission), AP 1 514 may be unable to use conventional CSMA/CA to evaluate the medium and also to find out if STA C 502c is able to receive data. A mechanism is needed to enable the AP 1 514 to opportunistically transmit data to STA C 502c in the downlink when it receives data from STA A 502a in the uplink.

Also shown in the example of FIG. 5, AP 1 514 may decide to start a full-duplex with a transmission from STA A 502a and a transmission to STA C 502c that commences at the same time. In this case, both the uplink and downlink may be classified as primary. A mechanism is needed to (a) identify that STA A 502a has data to send in the uplink, (b) identify that STA C 502c is ready to receive in the downlink and (c) identify when the synchronized full-duplex transmission takes place.

Figure 6:
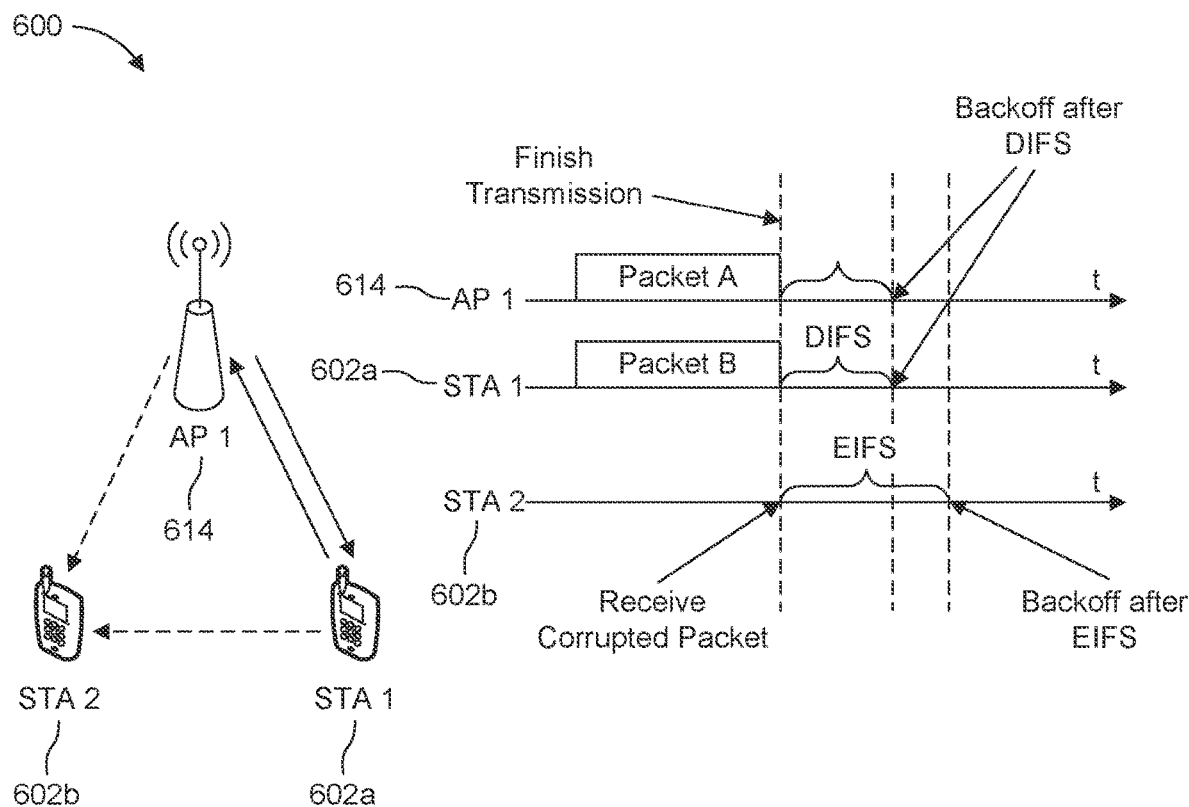
FIG. 6 is a diagram illustrating an example of contention fairness issue for full-duplex operation.

FIG. 6 illustrates an example of a contention fairness issue 600 for full-duplex operation. A conventional back-off scheme may not work well for full-duplex operation for unintended STAs that can receive both the primary and secondary transmissions. For example, a simple pair-wise full-duplex operation scenario may have the following issues: STA 2 602b can receive from both AP 1 614 and STA 1 602a; STA 1 602a receives packet A successfully and AP 1 614 receives packet B successfully, but STA 2 602b receives a corrupted packet (overlapped version of packets A and B); and/or AP 1 614 and STA 1 602a back off after Distributed Coordination Function Interframe Spacing (DIFS) but STA 2 602b back offs after Extended Interframe Space (EIFS), which is may be unfair for STA 2 602b. This means that STAs (i.e. STA1 602a and AP 1 614) can hear only one STA or one AP may have advantage to other STAs (i.e. STA 2 602b) that can hear multiple STAs in terms of decoding packets. It is because if a STA can hear only one and decode the received packets, the STA may back off after DIFS duration. However, if a STA can hear multiple STAs but cannot decode the received packets, the STA may back off after EIFS duration. In order to overcome the aforementioned contention fairness issues and support efficient full-duplex operation in WLAN, it may be desirable to design a channel access mechanism after full-duplex transmission to allow unintended STA of the full-duplex transmission to access the channel in a fair manner.

To enable analog and digital cancellation, it may be necessary for a full-duplex STA to be able to estimate the self-interference of its transmitter in the absence of interference from any additional STAs. Methods are needed to ensure that there is no external interference from other STAs and that there is a way that the STA may be able to transmit a suitable estimation sequence to able to estimate the self-interference and design the cancellation circuits (e.g. analog and digital cancellation circuits).

In one embodiment, a full-duplex frame structure and preamble may be implemented. FIGS. 7A-7D illustrate examples frame structures 700 for full-duplex training, which may be used in combination with any of other embodiments described herein. To enable the design and estimation of full-duplex filters, equalizers, or cancellation circuits for self-interference cancellation, it may be necessary that a full-duplex STA/AP acquire the medium to prevent external interference and then transmit a full-duplex training sequence. The full-duplex training sequence for example, may take one or more forms.

For example, FIG. 7A illustrates an example frame structure 710 for full-duplex training as a standalone frame, which may be used in combination with any of other embodiments described herein. As illustrated in FIG. 7A, the frame 710 may include a legacy frame 712 and an FD preamble 714. The legacy frame 712 may include, for example, a short training field that includes one training sequence and a long training field that includes the other training sequence. The FD preamble 714 may include one or more training sequences and FD parameters. The one or more training sequences may include, but are not limited to, a time domain sequence for the analog domain and a frequency domain sequence for the digital domain. The one or more training sequences included in the FD preamble 714 may be referred to as a FD training sequence. As illustrated in FIG. 7A, shows that the training sequence may be a standalone frame where the frame may be comprised of a legacy preamble then a full-duplex preamble.

In another example, (b) of FIG. 7 shows a second preamble (full-duplex preamble) sent after the legacy preamble but before the data transmission. This frame may be comprised of a legacy preamble, a full-duplex preamble, and data. The presence or absence of the full-duplex preamble may be signaled in the legacy preamble, such as the SIG field. In another example, (c) of FIG. 7 shows a mid-amble sequence that may be transmitted at desired intervals within the transmitted frame. This frame may be comprised of a legacy preamble, a full-duplex preamble, and multiple full-duplex mid-ambles to enable the dynamic modification of the parameters of the full-duplex filters/equalizers. In another example, (d) of FIG. 7 shows a control trailer.

In one solution, a single full-duplex training sequence may be used to design both analog and digital cancellation circuits. Alternatively, separate full-duplex training sequences may be used to design each analog and digital cancellation circuit. As such, the full-duplex STA (or AP) may choose to transmit the analog training sequence, the digital training sequence, or both. This may be especially important since the analog cancellation may be performed by multiple methods that may not need explicit training.

Figure 8:
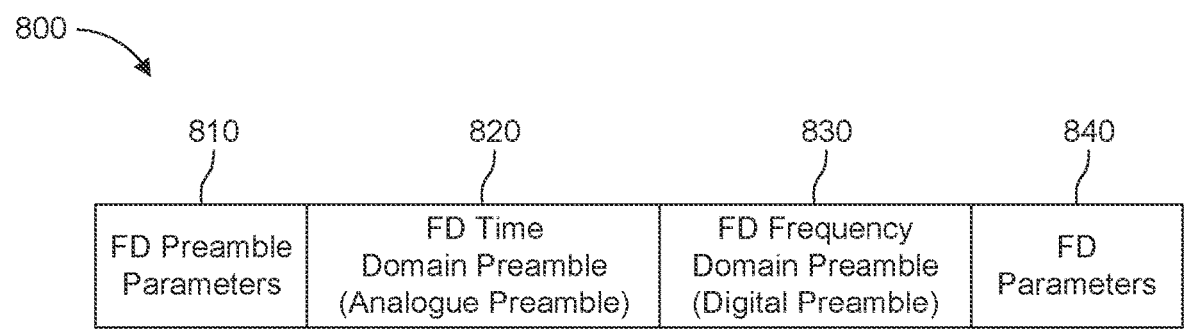
FIG. 8 is a diagram illustrating an example full-duplex preamble.

FIG. 8 illustrates an example full-duplex preamble. The full-duplex preamble may be a fixed number of symbols or may have the number of symbols configurable. In one case, the number of symbols to be used may be configured prior to transmission or may be signaled in a PHY domain field (e.g., the preamble or SIG field). As shown in FIG. 8, there may be several fields any appropriate order.

There may be a full-duplex Preamble Parameters field that signals information about whether the full-duplex preamble is analog only, digital only or both. It may also signal the size or duration of the analog and digital preamble fields. It may signal the specific digital domain numerology to be used (e.g. 64 subcarriers per 20 MHz for 802.11a, 802.11n, and 802.11ac; 256 subcarriers per 20 MHz for 802.11ax).

There may be a full-duplex Time Domain Preamble field that may be used for the full-duplex analog filter design. There may be a full-duplex Frequency Domain Preamble field that may be used for the full-duplex digital filter design. There may be a full-duplex Parameter field 840 may be used for parameters for the full-duplex transmission. This full-duplex parameters field 840 may include, but are not limited to, information on the start time of the full-duplex transmission, and the specific STAs to transmit.

The STA or AP performing the full-duplex filter design may use the full-duplex preamble parameters 810 to identify the duration of the training sequences for the analog filter and the digital filter. The STA or AP may then communicate information to other STAs or APs on the parameters necessary to start the full-duplex transmission.

The transmit and receive address of this frame may be addressed to the full-duplex capable STA (e.g., the AP in the asymmetric full-duplex architecture).

To prevent any external interference, the full-duplex preamble 800 may be transmitted in scenarios when the full-duplex AP/STA have acquired the channel.

In one embodiment, there may be channel access procedures for addressing asymmetric full-duplex scenarios. In this embodiment, the STA may have half-duplex capability, but the AP may have full-duplex capability. Further, in one example, a procedure for channel access may be AP controlled (i.e. the AP determines when data to and from STAs may be expected to be transmitted).

Figure 9:
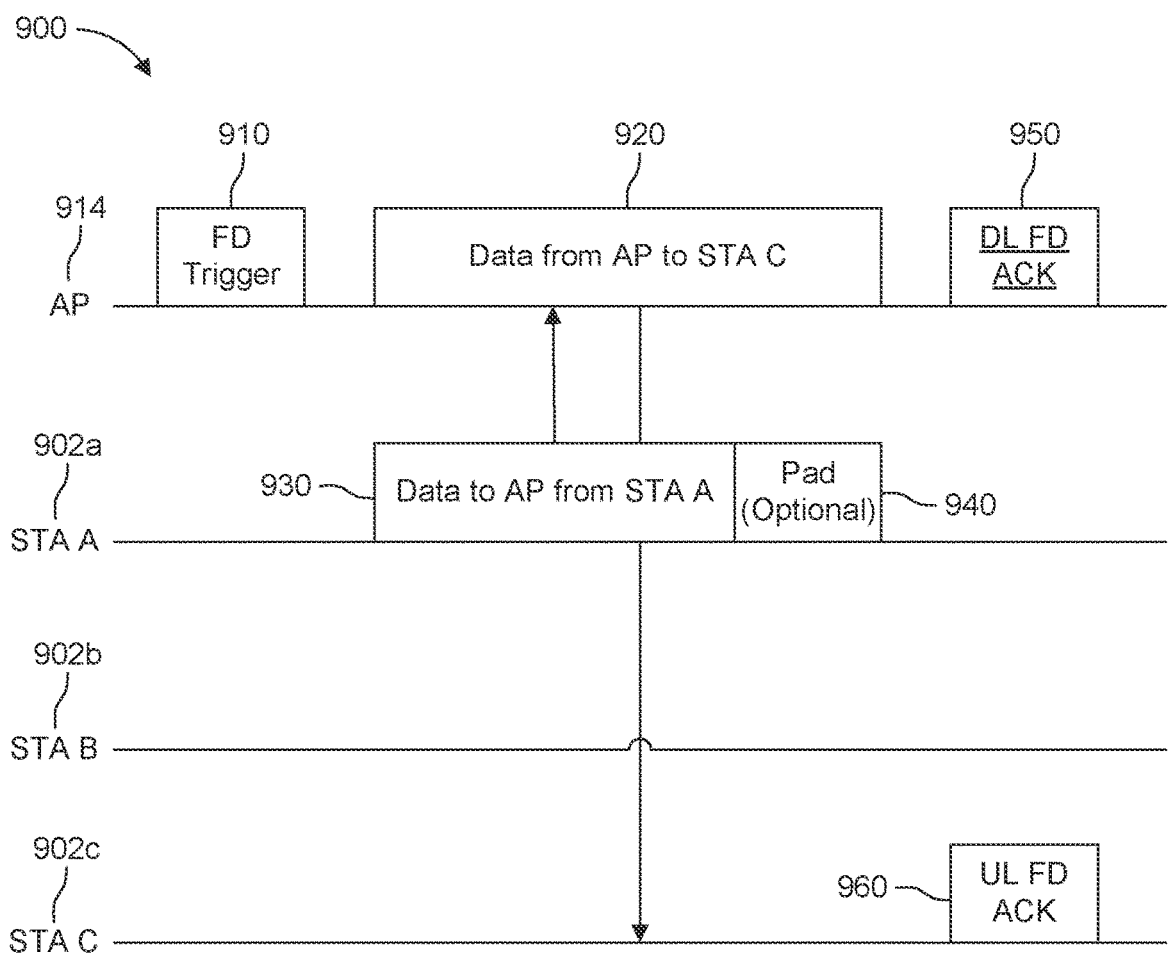
FIG. 9 is a diagram illustrating an example procedure for synchronized full-duplex transmission.

FIG. 9 illustrates an example overall procedure 900 for synchronized full-duplex transmission, which may be used in combination with any of other embodiments described herein. The example overall procedure 900 may address asymmetric full-duplex scenarios. In this example, an AP 914 may have full-duplex capability and STAs 902a, 902b, 902c may have half-duplex capability. To enable full-duplex transmission controlled by the AP 914 to occur at synchronized, predetermined times, the AP 914 may transmit a full-duplex trigger frame 910 or a full-duplex scheduling frame such as a full-duplex CTS. The full-duplex trigger frame 910 and/or the full-duplex scheduling frame may indicate: (1) STA(s) to which the AP 914 is transmitting in the downlink (e.g., STA C 902c); and (2) STA(s) from which it expects to receive in the uplink (e.g., STA A 902a). After STA A 902a and STA C 902c receive the full-duplex trigger frame 910 (or the full-duplex scheduling frame), STA A 902a and the AP 914 may initiate the full-duplex transmissions (e.g., downlink data transmission 920 and uplink data transmission 930) at the same time. For example, the downlink transmission 920 from the AP 914 to STA C 902c may commence at a fixed duration (e.g. SIFS, PIFS, EIFS) after the full-duplex trigger frame 910 or full-duplex scheduling frame is received. Alternatively or additionally, the commencement of the downlink transmission 920 may be configured by the full-duplex trigger frame 910 or full-duplex scheduling frame. Similarly, the uplink transmission 930 from STA A 902a to the AP 914 may commence at a fixed duration (e.g. SIFS, PIFS, EIFS) after the reception of the full-duplex trigger frame 910 or full-duplex scheduling frame. Alternatively or additionally, the commencement of the uplink transmission 930 may be configured by the full-duplex trigger frame 910 or full-duplex scheduling frame. The full-duplex trigger frame is a trigger frame dedicated to triggering the full-duplex transmission. The full-duplex trigger frame may include one or more fields, parameters, or information to enable the full-duplex transmission. The full-duplex scheduling frame is a frame that includes or is aggregated with one or more full-duplex scheduling elements/subframes. The one or more full-duplex scheduling elements/subframes may include parameters that are needed for the full-duplex transmission.

As illustrated in FIG. 9, if the packet size of the UL data transmission 930 is less than the packet size of the DL data transmission 920, STA A 902a may add pad information 940 to the UL data to make the duration of full-duplex transmission the same. Although it is not illustrated in FIG. 9, if the packet size of the DL data transmission 920 is less than the packet size of the UL data transmission 930, the AP 914 may append pad information to the DL data to make the duration of the full-duplex transmission the same. After the AP 914 successfully receives the UL data from STA A 902a (i.e. the UL transmission 930), the AP 914 may respond a DL full-duplex acknowledgement 950 to STA A 902a. Similarly, after the STA C 902c successfully receives the DL data from the AP 914 (i.e. the DL transmission 920), STA c 902c may respond a UL full-duplex acknowledgement 960 to the AP 914.

Figure 10:
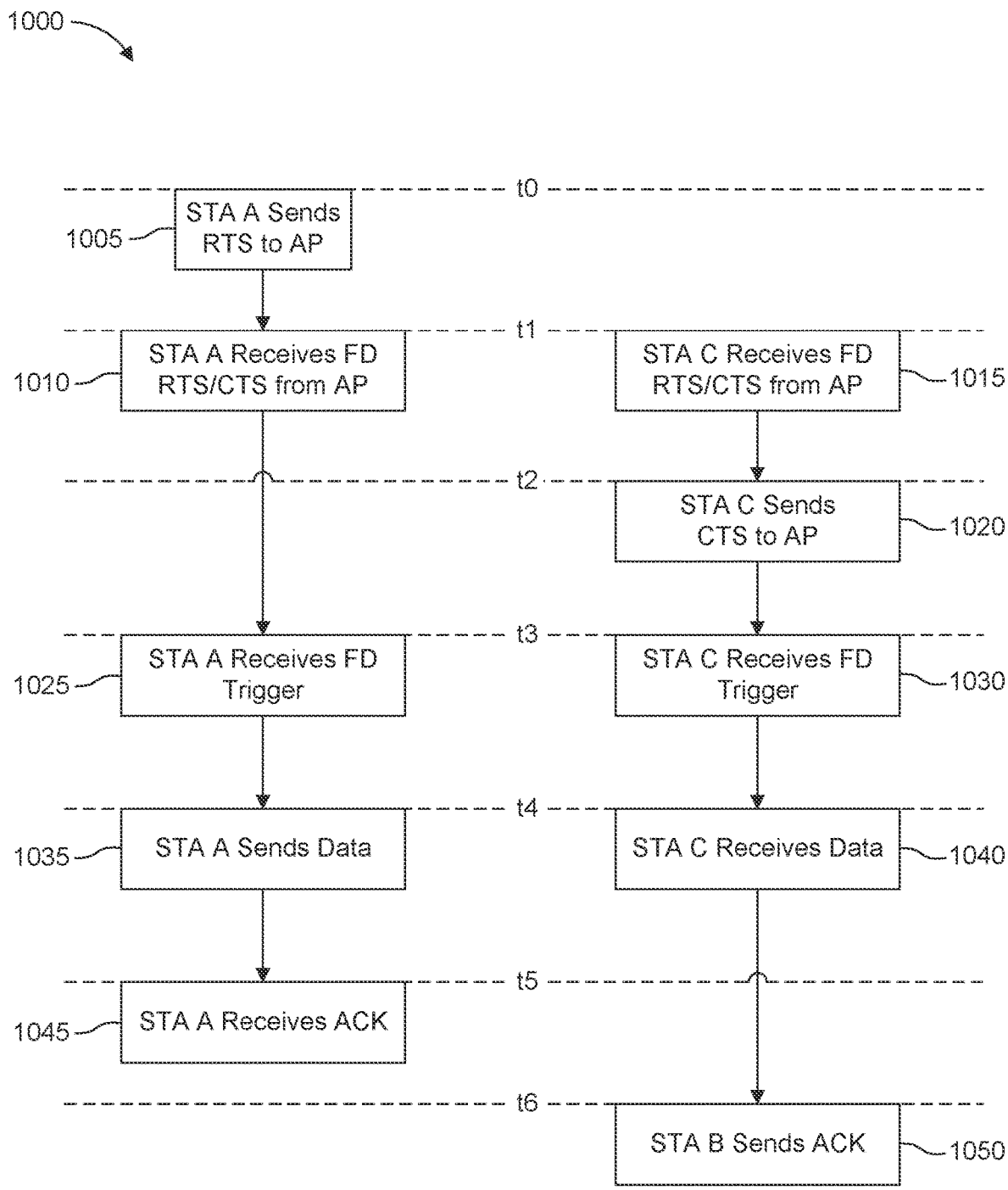
FIG. 10 is a diagram illustrating an example station (STA) procedure for synchronized full-duplex transmission.

FIG. 10 illustrates an example STA procedure 1000 for synchronized full-duplex transmission, which may be used in combination with any of other embodiments described herein. A procedure to enable synchronized full-duplex transmission may include first identifying STAs (e.g., STA A, STA B, and STA C) as full-duplex compatible. This may mean that a DL transmission to STA C will not be interfered with by an UL transmission from STA A or STA B. Then, STA A or STA B may be identified as having data to transmit to the AP.

The full-duplex transmission may be initiated by using a full-duplex preamble (i.e., to estimate the full-duplex filters), full-duplex trigger, or full-duplex scheduling frame (i.e., to schedule the STAs for full-duplex transmission). The full-duplex trigger, for example, may be a separate frame, may be combined with the downlink data, or may be combined with the frames identifying that there may be traffic to send (e.g., the CTS). After the transmission, a full-duplex ACK may be sent to enable both STAs to acknowledge receipt of the information.

In an embodiment, there may be a procedure for the AP to identify full-duplex stations with information to send in the uplink. The AP may receive an RTS frame from a STA A and send a frame (e.g., a full-duplex RTS/CTS frame) or a series of frames (e.g., a CTS {e.g., a full-duplex CTS frame} to STA A and a RTS {e.g., a full-duplex RTS frame} to STA C) to STA A and STA C indicating that it will be scheduling STA A and STA C for a full-duplex uplink transmission.

In one example, a two-hop RTS-CTS scheme may be used to identify the STAs to transmit. The full-duplex RTS and full-duplex CTS frames may be sent in a manner that ensures the medium is reserved and in a manner where the STAs that will be transmitting in the full-duplex transmission indicate that the medium is available for them to transmit. The full-duplex RTS and full-duplex CTS frames may be specific types of RTS and CTS frames, respectively.

The full-duplex CTS frame sent by the AP to STA A may be transmitted jointly with a full-duplex RTS frame to another STA B, for example as a full-duplex RTS/CTS frame indicating that the AP wants to find out if a second STA B is available to receive information while STA A is transmitting.

In one example, a single frame that contains information needed for both the full-duplex RTS and full-duplex CTS may be used (e.g. full-duplex RTS/CTS frame). In another example, the full-duplex RTS/CTS frame may be comprised of individual (full-duplex) RTS and (full-duplex) CTS frames aggregated together. In another example, the full-duplex RTS/CTS frame may indicate the time that STA A should initiate transmission either based on a full-duplex trigger or based on a pre-configured time duration from when the full-duplex CTS is received. In another example, a full-duplex training sequence may be appended to the full-duplex CTS/RTS frame to enable estimation of the full-duplex filters.

The RTS (e.g., full-duplex RTS) sent by the AP to another STA C may be transmitted a fixed duration (e.g., a SIFS or an EIFS) after the CTS (e.g., full-duplex CTS) response to STA A, indicating that the AP wants to find out if a second STA C is available to receive information while at the same time indicating that it is available to receive information from STA A. In one example, a full-duplex CTS may be sent to STA A indicating the time at which STA A may commence transmitting. The AP may then send an RTS frame to STA C (and any other frames needed to set up the full-duplex transmission). On receipt of the full-duplex CTS from the AP, the STA C may respond with a CTS to the AP.

The AP may use an NDP Feedback Report Poll Trigger to solicit NDP feedback reports from multiple STAs in which the STAs indicate any resource requests. The NDP Feedback Report Poll Trigger may include a list of eligible STAs based on the STAs that have data to be transmitted in the downlink. This may ensure that all the STAs are full-duplex compatible. The list may be explicit (e.g., the STA IDs of the eligible STAs are listed). Alternatively, the list may be implicit. In one example, the STA IDs of the STAs to be transmitted to in the DL are listed. A previous mapping may have identified the STAs that are allowed based on a full-duplex downlink transmission to a specific STA. In another example, a group ID may be used to identify the list of eligible STAs.

On identifying STAs with both uplink and downlink data, the AP may initiate full-duplex transmission.

There may be a procedure for AP synchronized asymmetric full-duplex transmission comprising of one or more phases. The phases may occur in any order. One phase may relate to full-duplex STA compatibility, where groups of STAS are identified as full-duplex compatible (i.e., as groups that can simultaneously transmit and receive from the AP).

In another phase, the full-duplex filter may be setup, where the AP may transmit a full-duplex training sequence to setup the full-duplex filters. The full-duplex training sequence may be transmitted as a separate full-duplex preamble. The full-duplex sequence may be transmitted as a full-duplex mid-amble, in which case the periodicity of the mid-amble may need to be signaled (e.g., in the full-duplex trigger so that the STA in the full-duplex uplink transmission may insert quiet periods in which it does not transmit). The transmission of the full-duplex preamble or mid-amble may be optional based on a PHY layer signal (e.g., a full-duplex signal where the full-duplex filters are already set).

In another phase, there may be FA STA identification where specific STAs may be identified for the full-duplex transmission using a full-duplex trigger or A-control frame.

In another phase, there may be full-duplex transmission which includes sending/receiving the full-duplex data. In another phase, there may be a full-duplex ACK, which includes sending DL and uplink ACKs. If the STAs are not full-duplex capable, a delayed block ACK mechanism may be used to ensure that the packets do not collide.

In one example, on receipt of the CTS from STA A, the AP may transmit a full-duplex frame to STA A. In another example, the full-duplex frame may contain a full-duplex preamble, full-duplex trigger, and data to STA A. The STA B may receive the full-duplex trigger and then start transmission at the appropriate time.

In one example, the full-duplex frame may include the full-duplex trigger and data with the full-duplex training sequence concatenated as a Controller Trailer (CT) to the CTS/RTS frame.

In one example, on receipt of the CTS, the AP may transmit the full-duplex trigger frame as a separate stand-alone frame. The STAs then transmit/receive at the appropriate time.

Figure 11:
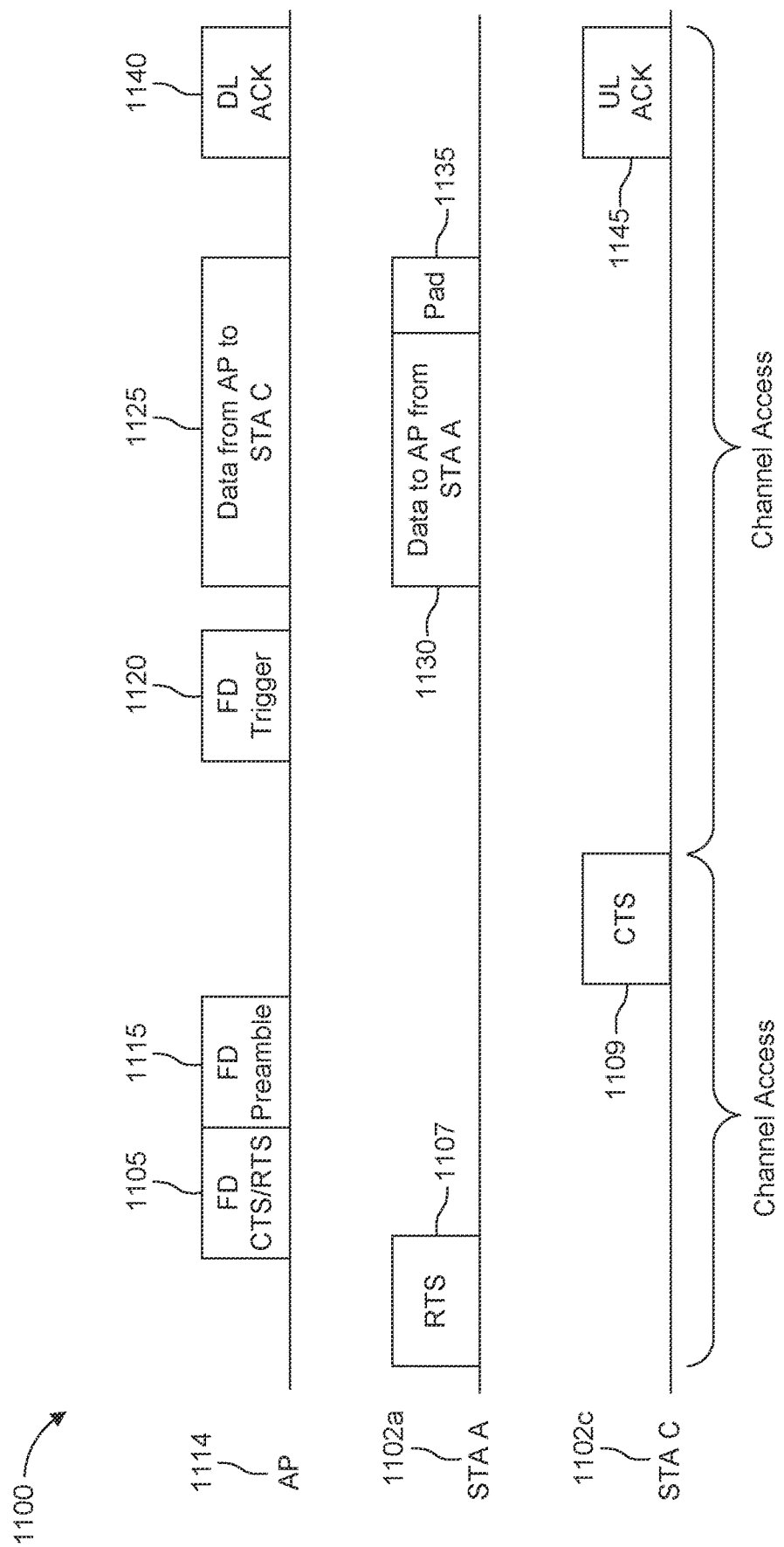
FIG. 11 is a diagram illustrating an example process for synchronized asymmetric full-duplex channel access where a full-duplex trigger is a standalone frame.

FIG. 11 illustrates an example process 1100 for synchronized asymmetric full-duplex channel access where a full-duplex trigger is a standalone frame, which may be used in combination with any of other embodiments described herein. As illustrated in FIG. 11, the example process 1100 may comprise channel access setup procedure and channel access procedure. During the channel access setup procedure, an AP 1114 may identify whether: (1) STAs 1102a, 1102c are full-duplex compatible; and (2) STAs 1102a, 1102c have data to transmit/receive to/from the AP 1114. The AP may also train its full-duplex transceiver (or FD filter) using FD preamble 1115, but this may occur any stage of the example process 1100 and is not limited to the channel access procedure. During the channel access procedure, the AP 1114 may initiate FD transmission using a FD trigger frame or FD scheduling frame and transmit/receive acknowledgement signals to/from STAs 1102a, 1102c.

For example, the AP 1114 may receive an RTS frame 1107 from STA A 1102a. Based on the RTS frame 1107, the AP 1114 may find that STA A 1102a has data to send and STA A 1102a is full-duplex compatible. The AP 1114 may determine whether the AP 1114 may transmit data to STA C 1102c at the same time while the AP 1114 receives data from STA A 1102a. The AP 1114 may transmit an FD CTS/RTS frame 1105 to STA A 1102a and STA C 1102c to indicate that the AP 1114 will schedule the full-duplex transmissions. The FD CTS/RTS frame 1105 may be one frame comprising an FD CTS and FD RTS, or separated frames such as an FD CTS and FD RTS. The FD RTS may be directed to STA A 1102a to indicate that the AP 1114 will schedule the full-duplex uplink transmission. The FD CTS may be directed to STA C 1102c to find whether STA C 1102c has data to send or receive. The FD CTS/RTS frame 1105 may enable the AP 1114 to send the FD CTS while requesting a CTS 1109 from STA C 1102c. It is assumed that the AP 1114 sets up its FD filter by sending an FD preamble 1115 to the AP 1114 itself. The FD preamble 1115 may include all the training information to enable the AP 1114 to perform the FD filter estimation. Once the AP 1114 receives a CTS 1109 from STA C 1102c, the AP may recognize that: (1) STA C 1102c can receive data from the AP 1114; and (2) STA C is FD compatible. The AP 1114 may also recognize by this point that: (1) STA A 1102a has data to send; and (2) STA A 1102a is FD compatible.

The AP 1114 may then send an FD trigger frame 1120 to STA A 1102a and STA C 1102c to enable the synchronized start for UL data transmission 1130 (i.e. STA A 1102a to AP 1114) and the DL data transmission 1125 (i.e. AP 1114 to STA C 1102c). The FD trigger frame 1120 may indicate the STAs 1102a, 1102c that: (1) the AP 1114 is expected to receive data from STA A 1102a at time t; and (2) the AP 1114 is expected to transmit data to STA C 1102c at time t. The FD trigger frame 1120 may include, but are not limited to, time and channel information for the FD transmissions from STA A 1102a and to STA C 1102c. For example, the time information may indicate STA A 1102a when to initiate the UL data transmission 1130 to the AP 1114 and when to end the UL data transmission 1130. The time information may also indicate STA C 1102c when to initiate the DL data transmission 1125 from the AP 1114 and when to end the DL data transmission 1125. The time information may include duration for the UL and DL transmissions (i.e. FD transmissions) 1125, 1130. The channel information may indicate which channel STA A 1102a and STA C 1102c may use for the FD transmissions. The FD trigger frame 1120 may also include data packet size, MCS to be used by the STAs 1102a, 1102c or any parameters to be used for the FD transmissions.

After receiving the FD trigger frame 1120, STA A 1102a may initiate the UL data transmission 1130 to the AP 1114 at the time indicated in the FD trigger frame 1120 (e.g., at time t). The AP 1114 may initiate the DL data transmission 1125 to STA C 1102c and STA C 1102c may receive the DL data 1125 from the AP 1114 at the time indicated in the FD trigger frame 1120 (e.g., at time t). It is noted that the FD transmissions 1125, 1130 may be an AP initiated transmissions based on STA A 1102a request. If the packet size of the UL data 1130 is less than the packet size of the DL data 1125, STA A 1102a may append pad information bits 1135 to the UL data 1130 to make the duration of the UL data transmission 1130 the same as the duration of the DL data transmission 1125. Although it is not illustrated in FIG. 11, if the packet size of the DL data 1125 is less than the packet size of the UL data 1130, the AP 1114 may append pad information bits to the DL data 1125 to make the duration of the DL data transmission 1125 the same as the duration of the UL data transmission 1130.

Once the AP 1114 successfully received the UL data 1130 from STA A 1102a, the AP 1114 may transmit a DL ACK signal 1140 to STA A 1102a to indicate the successful completion of the UL data 1130. Once STA C 1102c successfully received the transmission of DL data 1125 from the AP 1114, STA C 1102c may transmit an UL ACK signal 1145 to the AP 1114 to indicate the successful completion of the DL data 1125.

Figure 12:
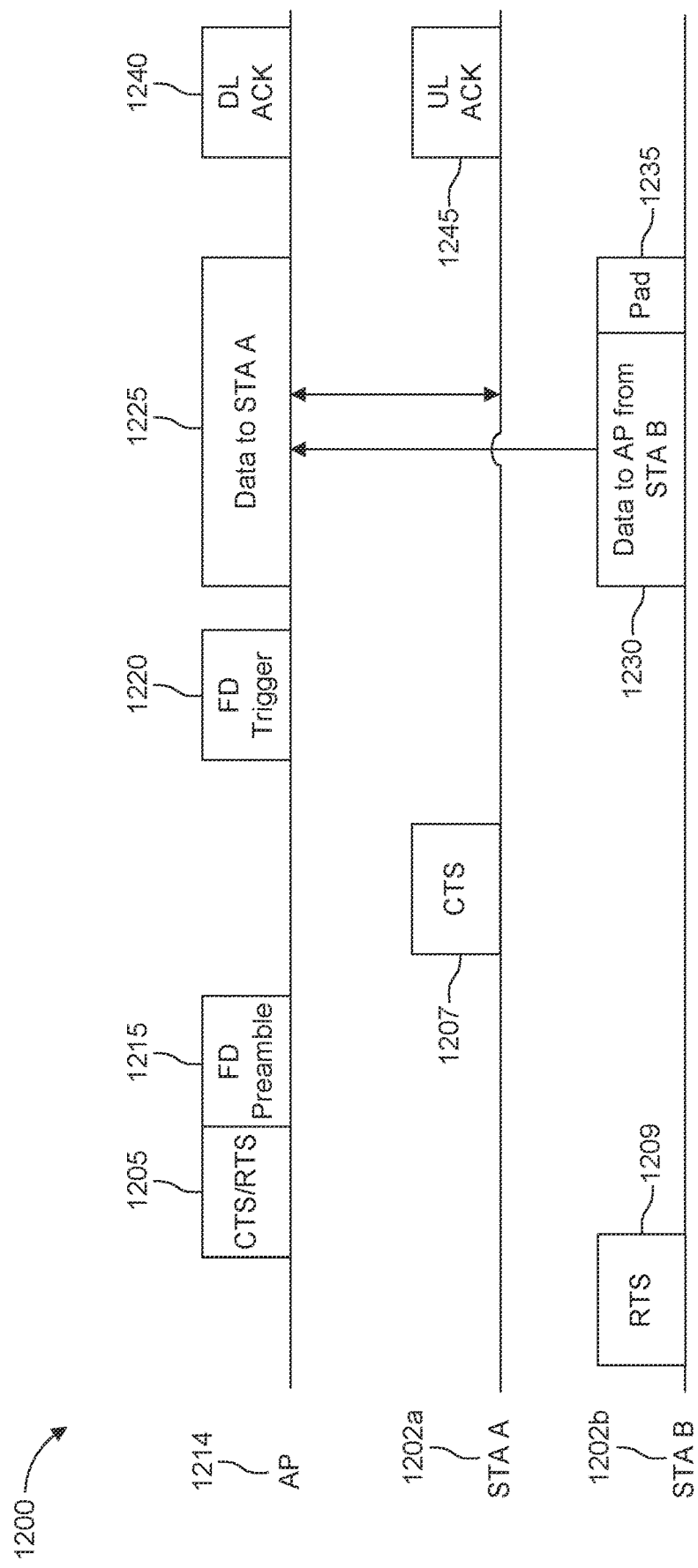
FIG. 12 is a diagram illustrating another example process for synchronized asymmetric full-duplex channel access where a full-duplex trigger is a standalone frame.

FIG. 12 illustrates another example process 1200 for synchronized asymmetric full-duplex channel access where a full-duplex trigger is a standalone frame, which may be used in combination with any of other embodiments described herein. As illustrated in FIG. 12, the AP 1214 may receive an RTS frame 1207 from STA B 1202b. Based on the RTS frame 1207, the AP 1214 may find that STA B 1202b has data to send and STA B 1202b is full-duplex compatible. The AP 1214 may determine whether the AP 1214 can transmit data to STA A 1202a at the same time while the AP 1214 receives data from STA B 1202b. The AP 1214 may transmit an FD CTS/RTS frame 1205 to STA A 1202a and STA B 1202b to indicate that the AP 1214 will schedule the full-duplex transmissions. The FD CTS/RTS frame 1205 may be one frame comprising an FD CTS and FD RTS, or separated frames such as an FD CTS and FD RTS. The FD CTS may be directed to STA B 1202*b* to indicate that the AP 1214 will schedule the full-duplex uplink transmission 1230. The FD RTS may be directed to STA A 1202*a* to find whether STA A 1202*a* has data to send or receive. The FD CTS/RTS frame 1205 may enable the AP 1214 to send the FD CTS while requesting a CTS 1209 from STA A 1202*a*. It is assumed that the AP 1214 sets up its FD filter by sending an FD preamble 1215 to the AP 1214 itself. The FD preamble 1215 may include all the training information to enable the AP 1214 to perform the FD filter estimation. Once the AP 1214 receives a CTS 1209 from STA A 1202*a*, the AP may recognize that: (1) STA A 1202*a* can receive data from the AP 1214; and (2) STA A is FD compatible. The AP 1214 may also recognize by this point that: (1) STA B 1202*b* has data to send; and (2) STA B 1202*b* is FD compatible.

The AP 1214 may then send an FD trigger frame 1220 to STA A 1202*a* and STA B 1202*b* to enable the synchronized start for UL data transmission 1230 (i.e. STA B 1202*b* to AP 1214) and the DL data transmission 1225 (i.e. AP 1214 to STA A 1202*a*). The FD trigger frame 1220 may indicate the STAs 1202*a*, 1202*b* that: (1) the AP 1214 is expected to receive data from STA B 1202*b* at time t; and (2) the AP 1214 is expected to transmit data to STA A 1202*a* at time t. The FD trigger frame 1220 may include, but are not limited to, time and channel information for the FD transmissions from STA B 1202*b* and to STA A 1202*a*. For example, the time information may indicate STA B 1202*b* when to initiate the UL data transmission 1230 to the AP 1214 and when to end the UL data transmission 1230. The time information may also indicate STA A 1202*a* when to initiate the DL data transmission 1225 from the AP 1214 and when to end the DL data transmission 1225. The time information may include duration for the UL and DL transmissions (i.e. FD transmissions) 1225, 1230. The channel information may indicate which channel STA A 1202*a* and STA B 1202*b* may use for the FD transmissions. The FD trigger frame 1220 may also include data packet size, MCS to be used by the STAs 1202*a*, 1202*b* or any parameters to be used for the FD transmissions.

After receiving the FD trigger frame 1220, STA B 1202*b* may initiate the UL data transmission 1230 to the AP 1214 at the time indicated in the FD trigger frame 1220 (e.g., at time t). The AP 1214 may initiate the DL data transmission 1225 to STA A 1202*a* and STA A 1202*a* may receive the DL data 1225 from the AP 1214 at the time indicated in the FD trigger frame 1220 (e.g., at time t). It is noted that the FD transmissions 1225, 1230 may be an AP initiated transmissions based on STA B 1202*b* request. If the packet size or duration of the UL data 1230 is less than the packet size of the DL data 1225, STA B 1202*b* may append pad information bits 1235 to the UL data 1230 to make the duration of the UL data transmission 1230 the same as the duration of the DL data transmission 1225. Although it is not illustrated in FIG. 12, if the packet size of the DL data 1225 is less than the packet size of the UL data 1230, the AP 1214 may append pad information bits to the DL data 1225 to make the duration of the DL data transmission 1225 the same as the duration of the UL data transmission 1230.

Once the AP 1214 successfully received the UL data 1230 from STA B 1202*b*, the AP 1214 may transmit a DL ACK signal 1240 to STA B 1202*b* to indicate the successful completion of the UL data 1230. Once STA A 1202*a* successfully received the DL data 1225 from the AP 1214, STA A may transmit an UL ACK signal 1245 to the AP 1214 to indicate the successful completion of the DL data 1225.

Figure 13:
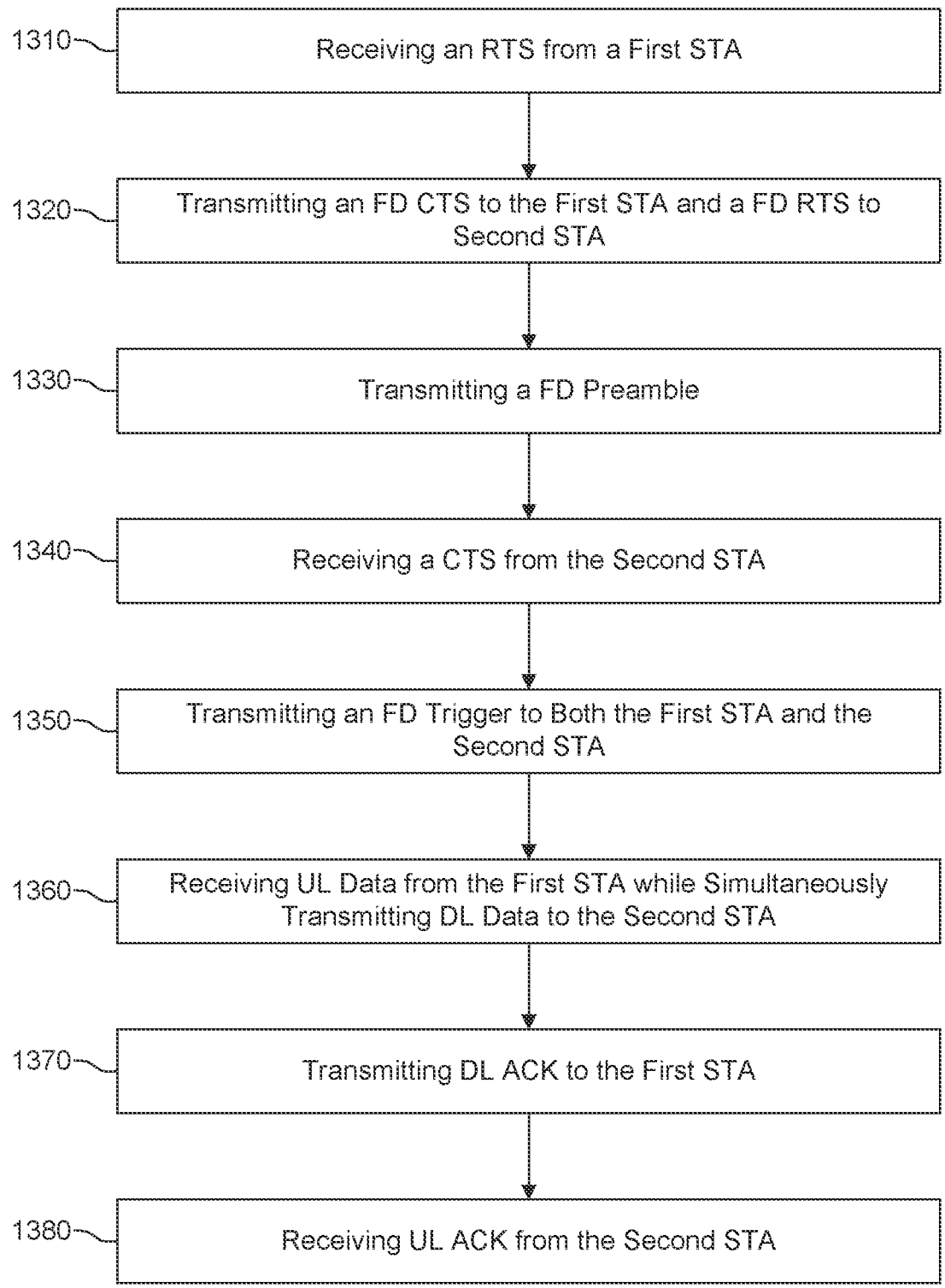
FIG. 13 is a diagram illustrating an example synchronized full-duplex transmission process.

FIG. 13 illustrates an example synchronized full-duplex transmission process 1300, which may be used in combination with any of other embodiments described herein. For example, at step 1310, an access point (AP) may receive an RTS frame from a first STA. At step 1320, in response to the received RTS frame, the AP may transmit a full-duplex clear to send (FD CTS) to the first STA and a full-duplex request to send (FD RTS) to a second STA. At step 1330, the AP may transmit an FD preamble to the AP itself to enable the AP to perform its FD filter estimation. At step 1340, in response to the transmitted FD RTS, the AP may receive a clear to send (CTS) from the second STA. Based on the received RTS, the AP may determine that the first STA is expected to transmit the UL data to the AP. Similarly, based on the received CTS, the AP may determine that the second STA is expected to receive the DL data from the AP. At step 1350, the AP may transmit, to both the first STA and the second STA, a full-duplex (FD) trigger frame that includes scheduling information that enables FD communication with the first STA for uplink (UL) data and the second STA for downlink (DL) data at the same time. The scheduling information in the FD trigger frame may include timing information and channel information for the FD communication. The AP may perform the FD communication with the first STA for the UL data and the second STA for the DL data, using the FD filter estimation. The FD trigger fame may be aggregated with at least one of a legacy preamble, a FD preamble, or UL/DL data. Based on the scheduling information, at step 1360, the AP may receive the UL data from the first STA while simultaneously transmitting DL data to the second STA. If the packet size of the DL data is less than the packet size of the UL data, the AP may append pad information to the DL data to equalize the packet size of the DL data to the packet size of the UL data. If the packet size of the UL data is less than the packet size of the DL data, the first STA may append pad information to the UL data to equalize the packet size of the UL data to the packet size of the DL data. After the FD communication is completed, the AP may transmit a DL ACK to the first STA at step 1370 and receive an UL ACK from the second STA at step 1380.

Figure 14:
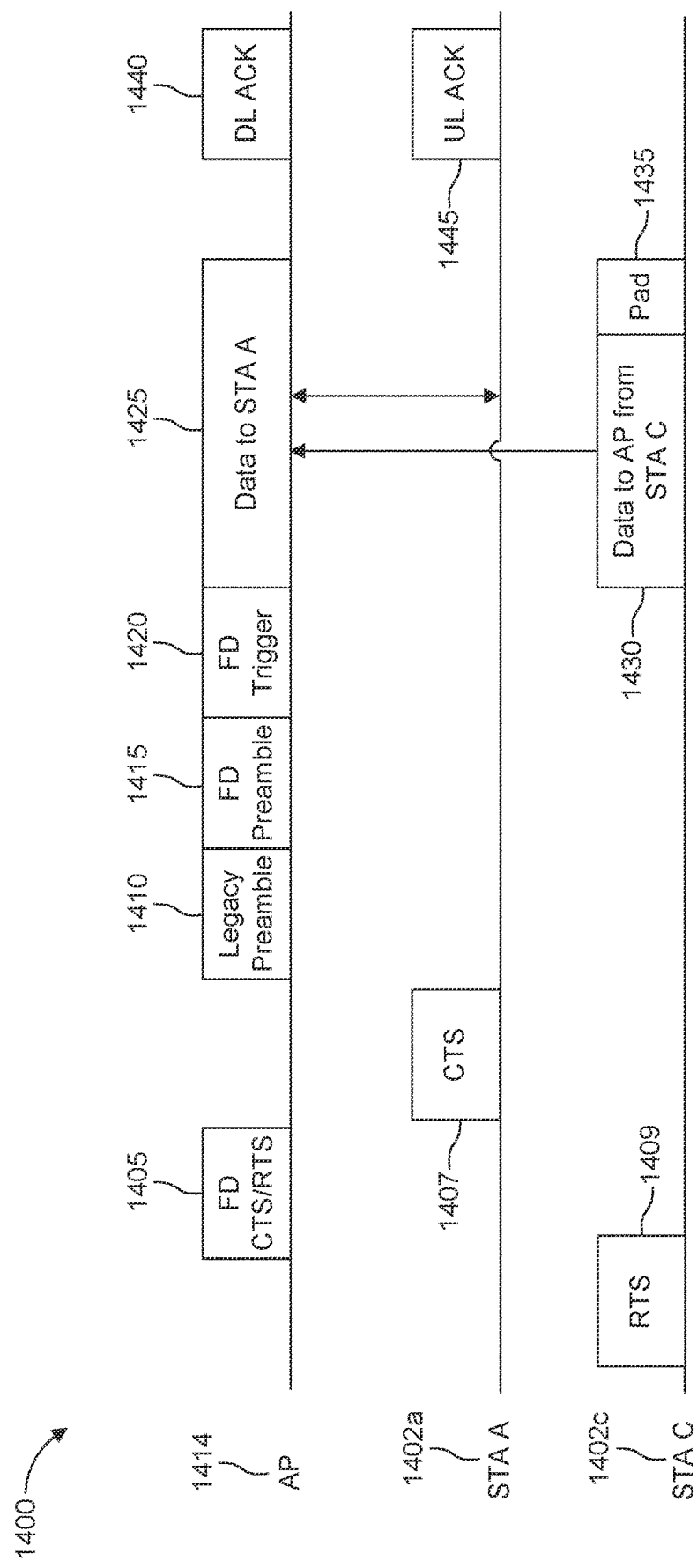
FIG. 14 is a diagram illustrating an example process for synchronized asymmetric full-duplex channel access where a full-duplex preamble and full-duplex trigger are aggregated with downlink data.

FIG. 14 illustrates an example process 1400 for synchronized asymmetric full-duplex channel access where a full-duplex preamble and full-duplex trigger are aggregated with downlink data, which may be used in combination with any of other embodiments described herein. As illustrated in FIG. 14, the AP 1414 may transmit a legacy frame 1410 before transmitting the FD preamble 1415 and the FD trigger frame 1420. The FD preamble 1415 and the FD trigger 1420 may be aggregated with downlink data transmission 1425 to STA A 1402*a* to enable synchronized FD transmissions. The contents of the FD preamble 1415 and the FD trigger 1420 are similar to or the same as those described in FIGS. 11 and 12. Details of the FD preamble 1415 and the FD trigger 1420 are not described for brevity. In addition, the channel access procedure using the RTS 1409, FD CTS/RTS 1405, and the CTS 1407, FD transmissions (i.e. DL data transmission 1425 and UL data transmission 1430), and DL/UL ACK 1440, 1445 are similar to or the same as those described in FIGS. 11 and 12. Details of those are not described for brevity.

Figure 15:
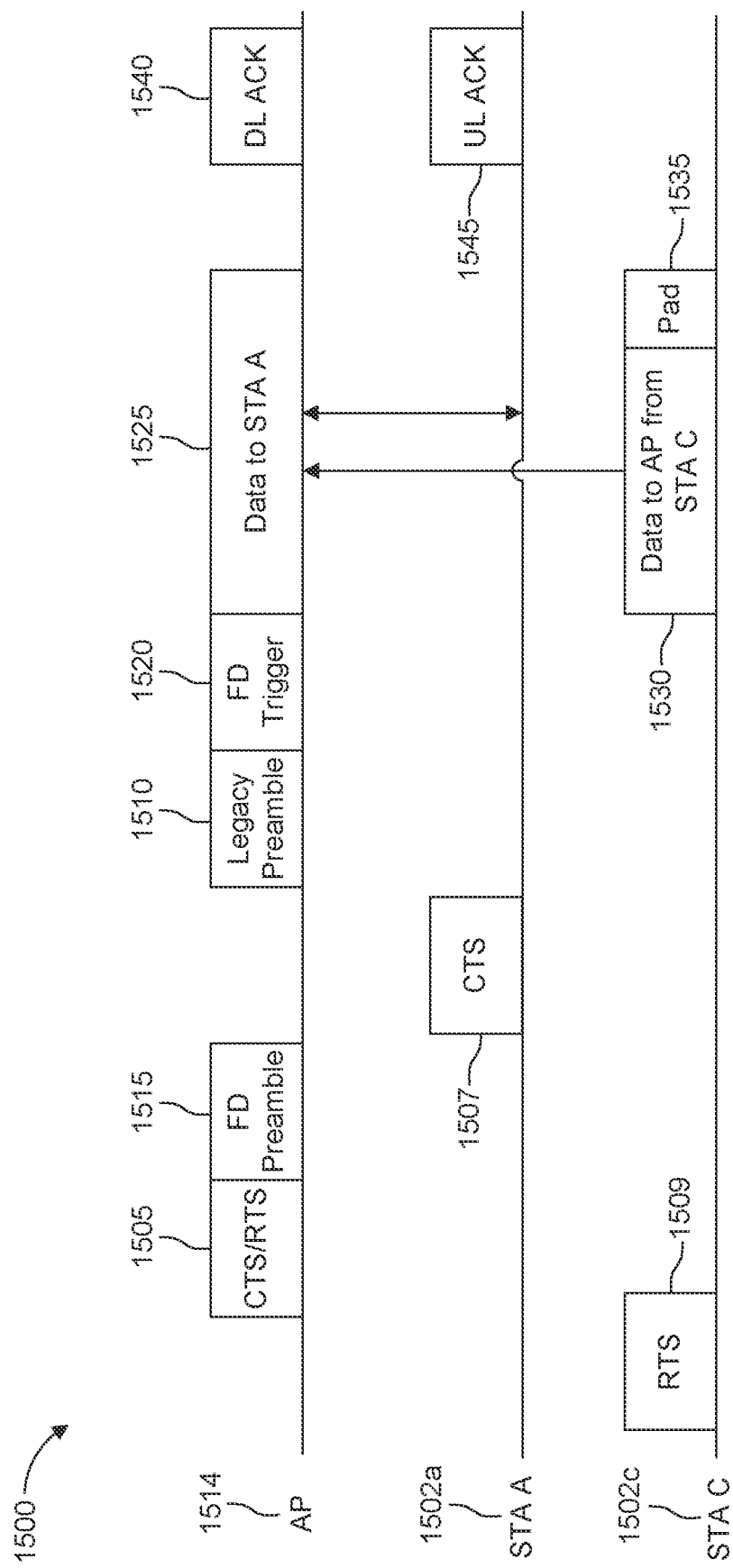
FIG. 15 is a diagram illustrating an example process for synchronized asymmetric full-duplex channel access where a full-duplex trigger is aggregated with downlink data and the full-duplex preamble is separate.

FIG. 15 illustrates an example process 1500 for synchronized asymmetric full-duplex channel access where a full-duplex trigger is aggregated with downlink data and the full-duplex preamble is separate, which may be used in combination with any of other embodiments described herein. As illustrated in FIG. 15, the AP 1514 may transmit the FD preamble 1515 separated from the FD trigger 1520.

For example, the FD preamble 1515 may be aggregated with the FD CTS/RTS frame 1505. Similar to FIG. 14, the FD trigger 1520 may be aggregated with downlink data transmission 1525 to STA A 1502a to enable synchronized FD transmissions. The contents of the FD preamble 1515 and the FD trigger 1520 are similar to or the same as those described in FIGS. 11 and 12. Details of the FD preamble 1515 and the FD trigger 1520 are not described for brevity. In addition, the channel access procedure using the RTS 1509, FD CTS/RTS 1505, and the CTS 1507, FD transmissions (i.e. DL data transmission 1525 and UL data transmission 1530), and DL/UL ACK 1540, 1545 are similar to or the same as those described in FIGS. 11 and 12. Details of those are not described for brevity.

Figure 16:
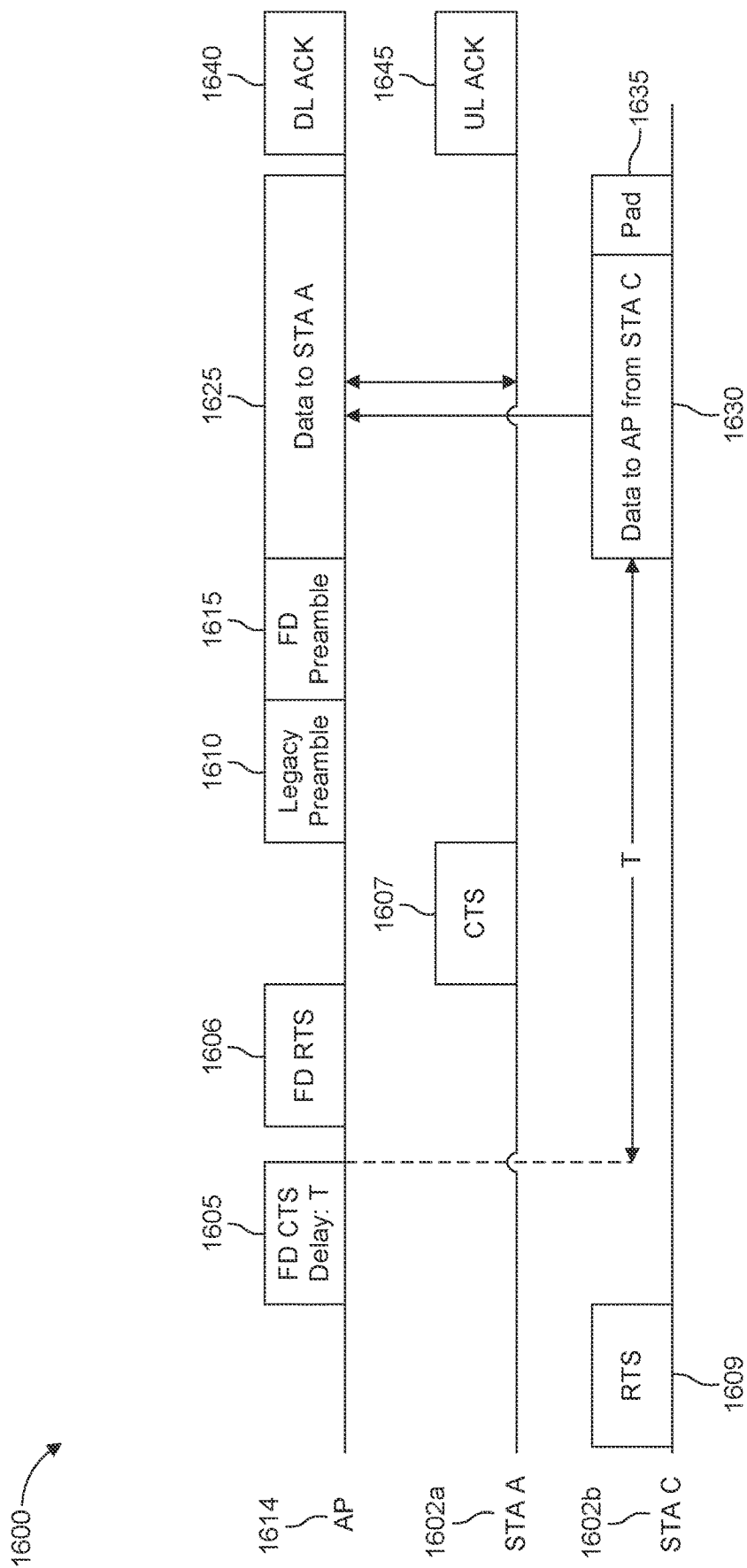
FIG. 16 is a diagram illustrating an example process for synchronized asymmetric full-duplex channel access with delayed clear-to-send (CTS)

FIG. 16 illustrates an example process 1600 for synchronized asymmetric full-duplex channel access with delayed CTS, which may be used in combination with any of other embodiments described herein. As illustrated in FIG. 16, the AP 1614 may transmit an FD CTS 1605 and an FD RTS 1606 separately. Specifically, the AP 1614 may transmit the FD CTS 1605 with delay time T to STA C 1602c in response to the RTS 1609. The FD CTS 1605 with delay time T may indicate STA C 1602c that the AP 1614 will not transmit an FD trigger frame and STA C is allowed to transmit automatically after time T is expired. After time T is passed, STA C 1602c may transmit UL data 1630 to the AP 1614 while the AP 1614 transmits DL data 1625 to STA A 1602a. Other than the delayed access using the FD CTS 1605 described above, details of the channel access procedures using the RTS 1609, FD CTS 1605, FD RTS 1606, CTS 1607, FD transmissions (i.e. DL data transmission 1625 and UL data transmission 1630), and DL/UL ACK 1640, 1645 are similar to or the same as those described in FIGS. 11 and 12. Details of those are not described for brevity.

In one embodiment, there may be procedures for opportunistic asymmetric full-duplex downlink transmission. In this embodiment there may be an asymmetric full-duplex system in which the STAs may be half-duplex but the AP has full-duplex capability. The procedures may be AP controlled. For example, an AP may respond opportunistically to UL transmission and send a DL full-duplex transmission to compatible STA(s) during the UL transmission. In one example, the AP may detect an incoming packet first and then decide to transmit to a suitable DL STA based on full-duplex compatibility. Alternatively or additionally, the AP may schedule an uplink grant/transmission opportunity (TXOP) for a STA, and when there is an arrival of data for a full-duplex compatible STA, the AP may then allocate a full-duplex DL transmission. In this example, because this is an opportunistic scenario, it may be necessary for the AP to set up full-duplex filters before the receipt of data from the uplink STA to be able to dynamically switch to full-duplex transmission.

Figure 17:
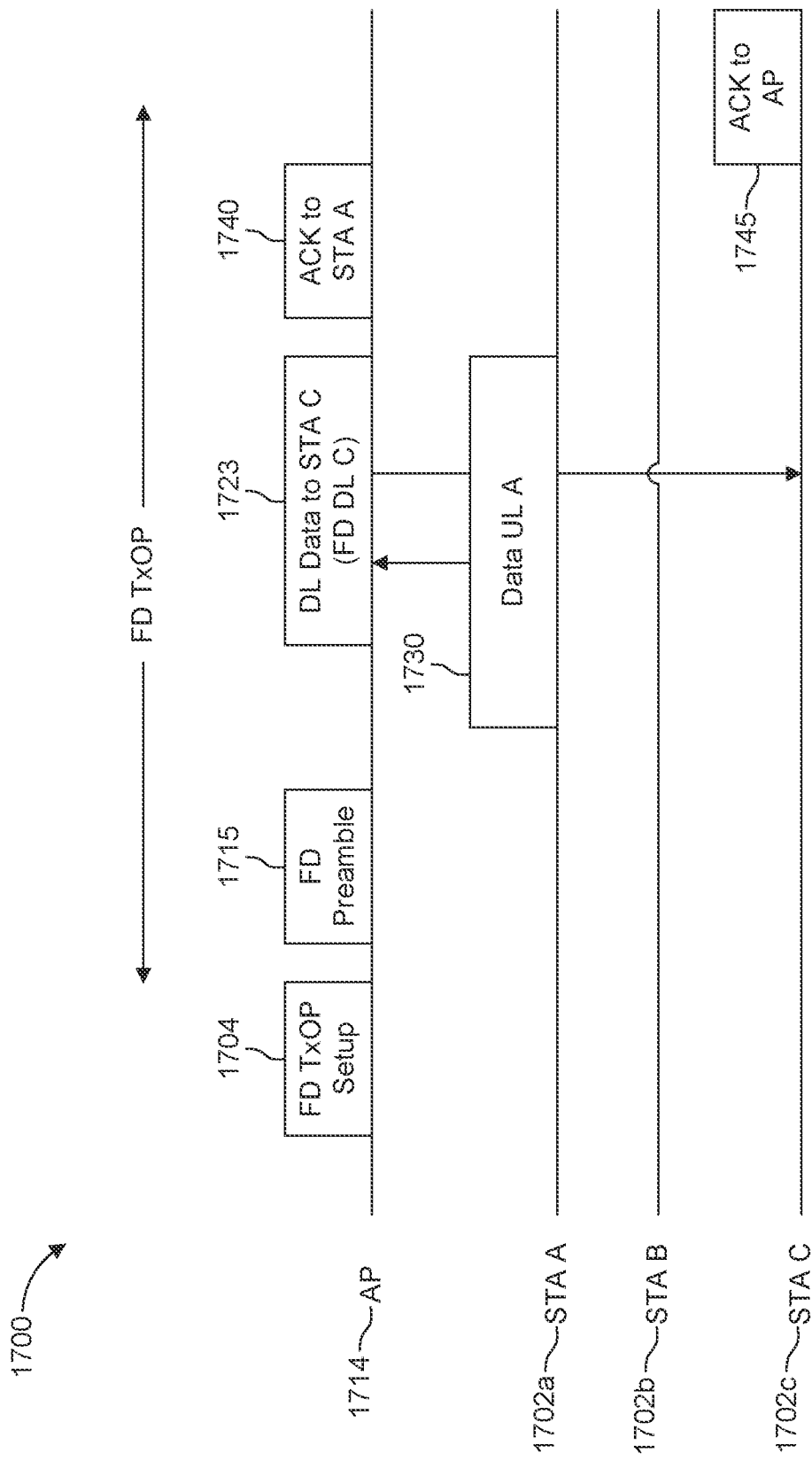
FIG. 17 is a diagram illustrating an example process for opportunistic downlink full-duplex transmission.

FIG. 17 illustrates an example process 1700 for opportunistic downlink full-duplex transmission, which may be used in combination with any of other embodiments described herein. Such an example procedure 1700 may start with an AP 1714 defining or setting up a full-duplex TXOP 1704 in which the AP and STAs in the BSS may expect a full-duplex transmission to occur. In one example, a two-hop RTS/CTS procedure may be used. In another example, a Restricted Access Window dedicated to full-duplex transmission may be set up.

The AP may then transmit a full-duplex preamble 1715 to estimate full-duplex equalizers/filters. The AP may then identify the full-duplex compatible STAs, for example, identify STAs A 1702a, B 1702b and C 1702c as full-duplex compatible. This may mean that an UL transmission from STA A or STA B will not interfere with a DL transmission to STA C. The identification of full-duplex compatibility on the STAs 1702a, 1702b, 1702c may be performed, for example, by RTS/CTS frames as described above.

STA A 1702a may acquire a channel, where the AP 1714 may know the duration. Upon identifying the UL transmission 1730, the AP 1714 may opportunistically initiate the full-duplex transmission. Specifically, the AP 1714 may initiate the full-duplex transmission by sending a simultaneous transmission (i.e. DL data 1723 to STA C 1702c) to STA C 1702c while receiving UL data 1730 from STA A 1702a using its full-duplex capability. In one example, on the setup of the full-duplex TXOP 1704, the AP 1714 may signal a STA (e.g., STA B 1702b, or STA C 1702c) or a group of STAs 1702b, 1702c (e.g., by a group ID) to indicate to the STAs 1702b, 1702c in the group that there is a possibility that they may receive an opportunistic DL transmission 1723. In another example, if the UL STA (e.g., STA A 1702a) sends an RTS request to the AP 1714, the AP 1714 may send a CTS that explicitly signals a STA (e.g., STA B 1702b, or STA C 1702c) or a group of STAs (e.g., STA B 1702b, and STA C 1702c) to expect an opportunistic DL transmission 1723 or implicitly informs a STA (e.g., STA B 1702b, or STA C 1702c) or a group of STAs (e.g., STA B 1702b, and STA C 1702c) to expect an opportunistic DL transmission 1723 based on the address of the STA (e.g., STA B 1702b, or STA C 1702c) where the CTS is sent to.

Once STA A 1702a acquires a channel and finishes the UL data transmission 1730, the AP 1714 may send an ACK 1740 to STA A 1702a. and the AP 1714 may expect a delayed ACK 1745 from STA C 1702 once the DL data transmission 1723 is finished. Although it is not illustrated in FIG. 17, the STA may also expect to receive an ACK 1745 from STA C 1702c and transmit a delayed ACK 1740 to STA A 1702a.

Figure 18:
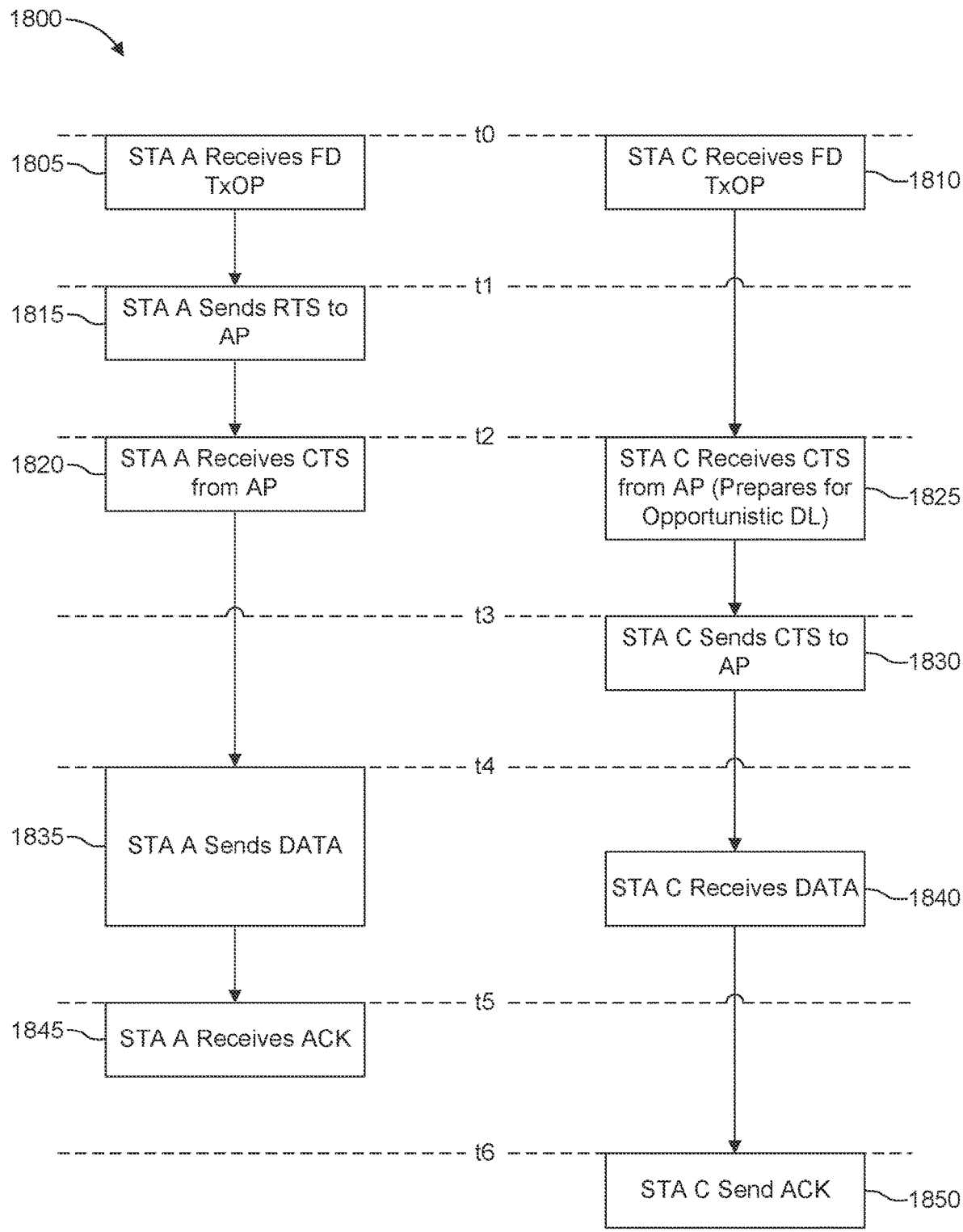
FIG. 18 is a diagram illustrating an example station (STA) procedure for opportunistic downlink full-duplex transmission.

FIG. 18 illustrates illustrating an example STA procedure 1800 for opportunistic downlink full-duplex transmission, which may be used in combination with any of other embodiments described herein. For example, an AP may define or set up a full-duplex TXOP in the BSS where the AP and STAs are located. At steps 1805 and 1810, STAs A, B and C may receive indications for the FD TxOP from the AP at time t0. The AP and STAs A, B, and C in the BSS may expect a full-duplex transmission to occur during the TXOP. At step 1815, STA A may send an RTS to the AP at time t1. At steps 1820 and 1825, STA A receives a CTS from the AP at time t2 and STA C may receive a CTS frame from the AP at time t2. The CTS directed to STA C may prepare STA C for the opportunistic DL transmission from the AP. At step 1830, in response to the received CTS frame, STA C may send a CTS frame to the AP at time t3. Based on these RTS/CTS frame exchanges, the AP may identify whether STA A and C are full-duplex compatible and determine whether an UL transmission from STA A or STA B will not interfere with a DL transmission to STA C.

At step 1835, STA A may acquire a channel and send UL data to the AP at time t4. The AP may know the duration of the UL data transmission from STA A. At step 1840, the AP may initiate a full-duplex transmission by sending a simultaneous transmission (i.e. DL data) to STA C while receiving the UL data from STA A. The full-duplex transmission (i.e. DL data transmission from the AP to STA C) may occur at any time during the duration of the UL data transmission from STA A to the AP. Once STA A finishes the UL data transmission, at step 1845, STA A may receive an ACK from the AP at time t5. At step 1850, STA C may send a delayed ACK to the AP when the DL data transmission from the AP is finished at time t6. Although it is not illustrated in FIG. 18, STA C may transmit an ACK to the AP at time t5 and STA A may receive a delayed ACK from the AP at time t6. It is noted that the AP may transmit a full-duplex preamble to estimate full-duplex equalizers/filters at any time before the full-duplex transmission occurs.

In one embodiment, there may be procedures for opportunistic asymmetric full-duplex uplink transmission. In this embodiment, the STAs may be half-duplex but the AP may have full-duplex capability.

In one scenario, the procedure may be AP controlled where the AP sends a DL transmission to a STA (e.g., STA C) and multiple STAs may desire to send data opportunistically to the uplink due to the full-duplex capabilities of the AP. Because of the opportunistic nature of the scenario, it may be necessary for the AP to set up the full-duplex filters before transmission of data to the uplink STA to be able to dynamically switch to full-duplex transmission.

Figure 19:
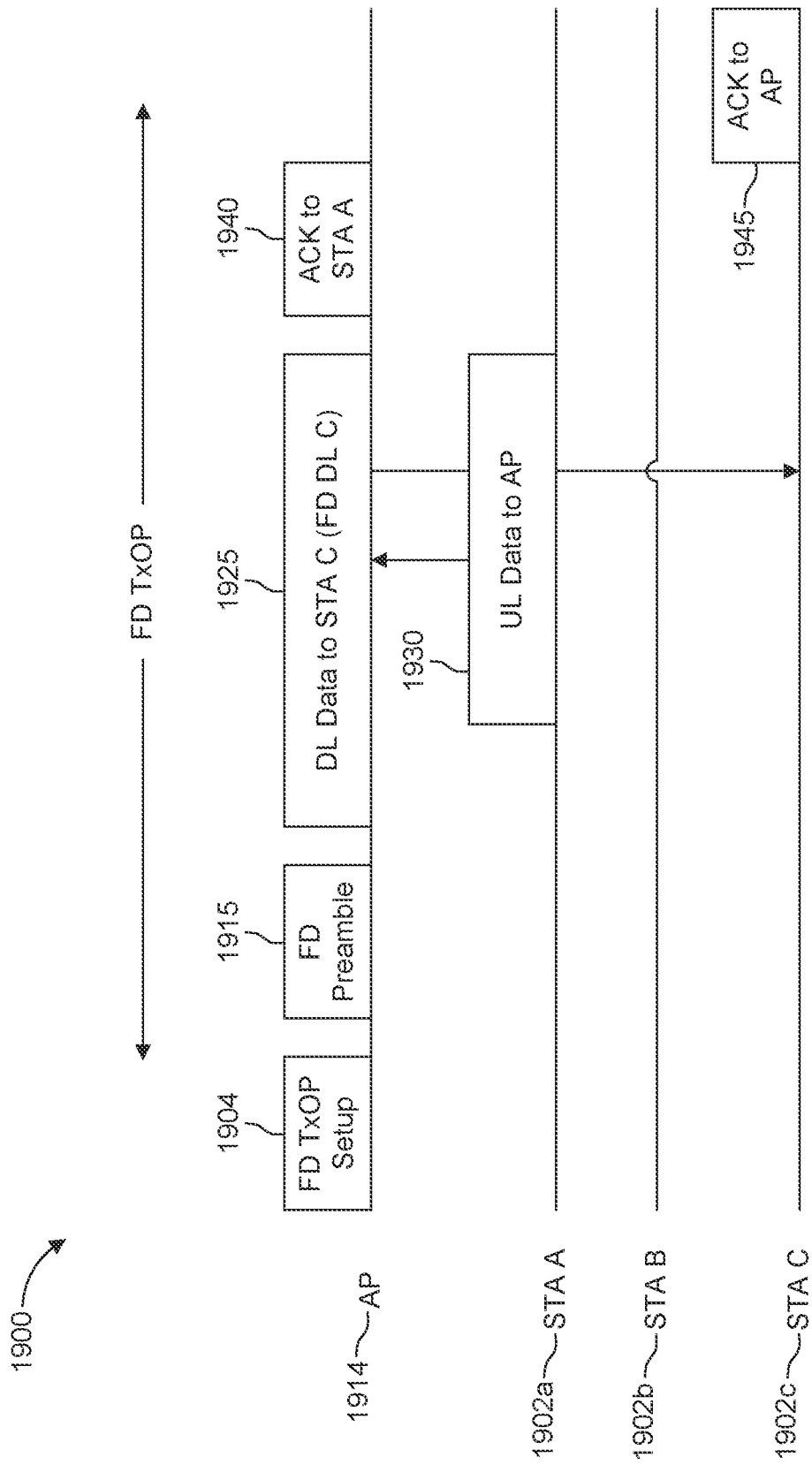
FIG. 19 is a diagram illustrating an example process for opportunistic asymmetric full-duplex uplink transmission for pre-configured station (STA)

FIG. 19 illustrates an example process 1900 for opportunistic asymmetric full-duplex uplink transmission for a pre-configured station (STA), which may be used in combination with any of other embodiments described herein. This example procedure 1900 may start with an AP 1914 defining or setting up a full-duplex TXOP 1904 in which the AP 1914 and STAs 1902a, 1902b, 1902c in the BSS may expect a full-duplex transmission to occur. In one example, a two-hop RTS RTS/CTS procedure may be used. In another example, a Restricted Access Window dedicated to full-duplex transmission may be set up. The AP 1914 may transmit a full-duplex preamble 1915 to estimate full-duplex equalizers/filters before the full-duplex transmission occurs In this example, the STA(s) (e.g., STA A 1902a) that opportunistically transmit (e.g., UL Data transmission 1930 from STA A 1902a) may be pre-configured. As illustrated in FIG. 19, the AP 1914 may initiate a full-duplex transmission by sending a DL data 1925 to STA C 1902c. In one example, during the setup of the full-duplex TXOP 1904, the AP 1914 may configure a STA (e.g., STA A 1902a) or a group of STAs (e.g., by a group ID) to transmit opportunistically to the AP 1914. In another example, the AP 1914 may send an RTS or a CTS to configure a STA (e.g., STA A 1902a) or a group of STAs to transmit opportunistically to the AP 1914. For example, if the AP 1914 transmits DL data 1925 to STA C 1902c, only STA A 1902a may be allowed to transmit UL data 1930 simultaneously to the AP 1914.

Once STA A 1902a finishes the opportunistic UL data transmission 1930 to the AP 1914, the AP 1914 may send an ACK 1940 to STA A 1902a. The AP 1914 may expect to receive a delayed ACK 1945 from STA C 1902c after the DL data transmission 1925 is finished. Although it is not illustrated in FIG. 19, the AP 1914 may receive an ACK first from STA C 1902c and transmit a delayed ACK to STA A 1902a.

In one scenario, a contention gap may be set within the DL transmission to allow the uplink STAs to contend for the channel.

Figure 20:
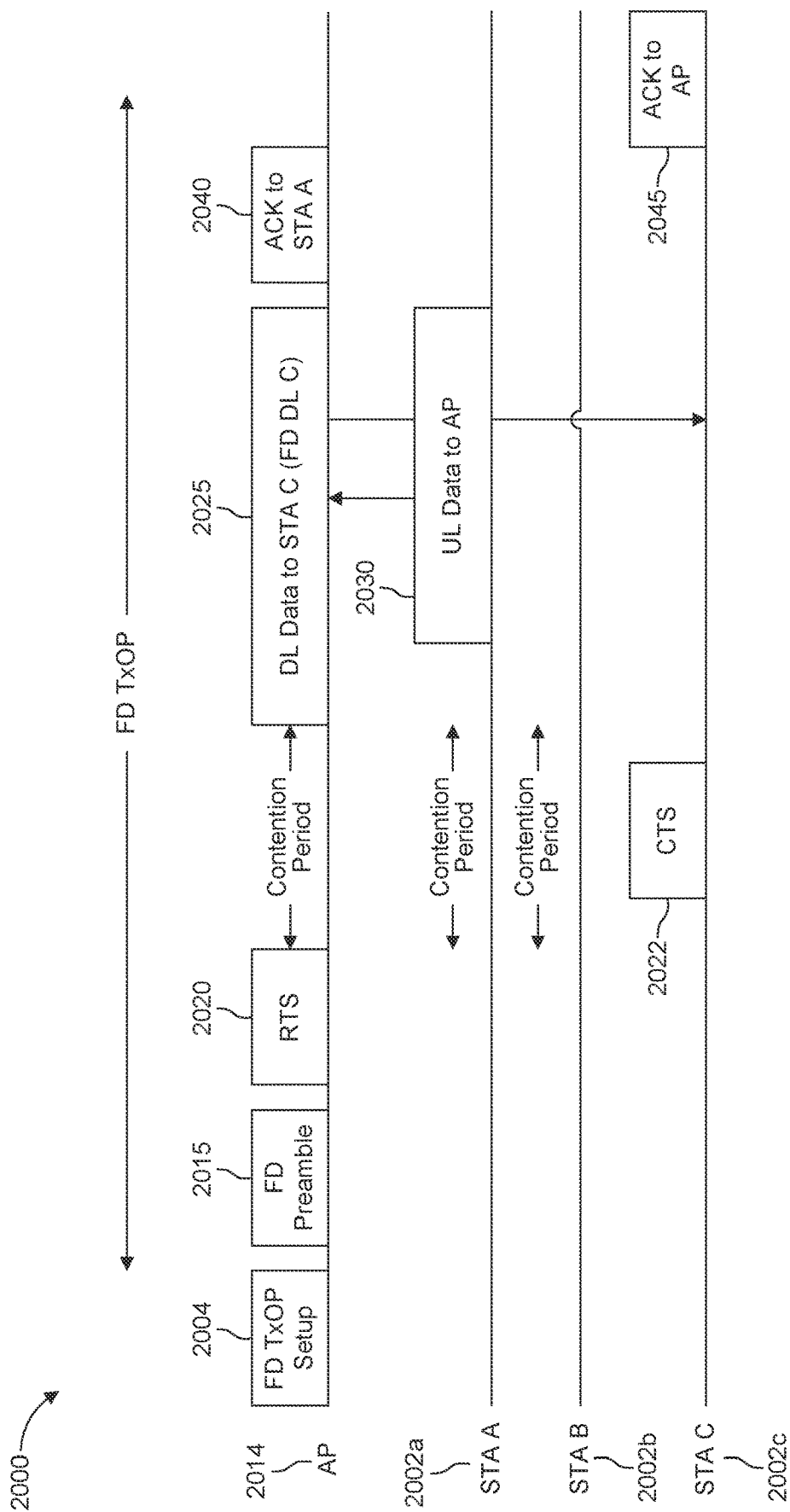
FIG. 20 is a diagram illustrating an example process for opportunistic asymmetric full-duplex uplink transmission for a single downlink contention period.

FIG. 20 illustrates an example process 2000 for opportunistic asymmetric full-duplex uplink transmission for a single DL contention period, which may be used in combination with any of other embodiments described herein. As illustrated in FIG. 20, after the AP 2014 transmit an RTS frame 2020 to STA C 2002c for the DL data transmission 2025, the STA A 2002a and STA B 2002b may have contention period for opportunistic UL data transmission 2030. During this contention period, STA A 2002a and STA B 2002b may compete with each other to access a channel. If STA A 2002a obtains the channel access, STA A 2002 may initiate the UL data transmission 2030 at any time during the DL data transmission 2025 to STA C 2002c. In this case, the contention gap or contention period may be initiated during or after the CTS 2022 is transmitted to the AP 2014 from STA C 2002c. As described above, STA A 2002a and STA B 2002b may contend for the channel in that duration. The details of the FD TXOP setup 2004, FD preamble 2015, an ACK 2040 transmitted to STA A 2002a, and a delayed ACK 2045 transmitted to the AP 2014 may be similar to or the same as those described in FIGS. 17, 18, and 19 and are not described in FIG. 20 for brevity.

Figure 21:
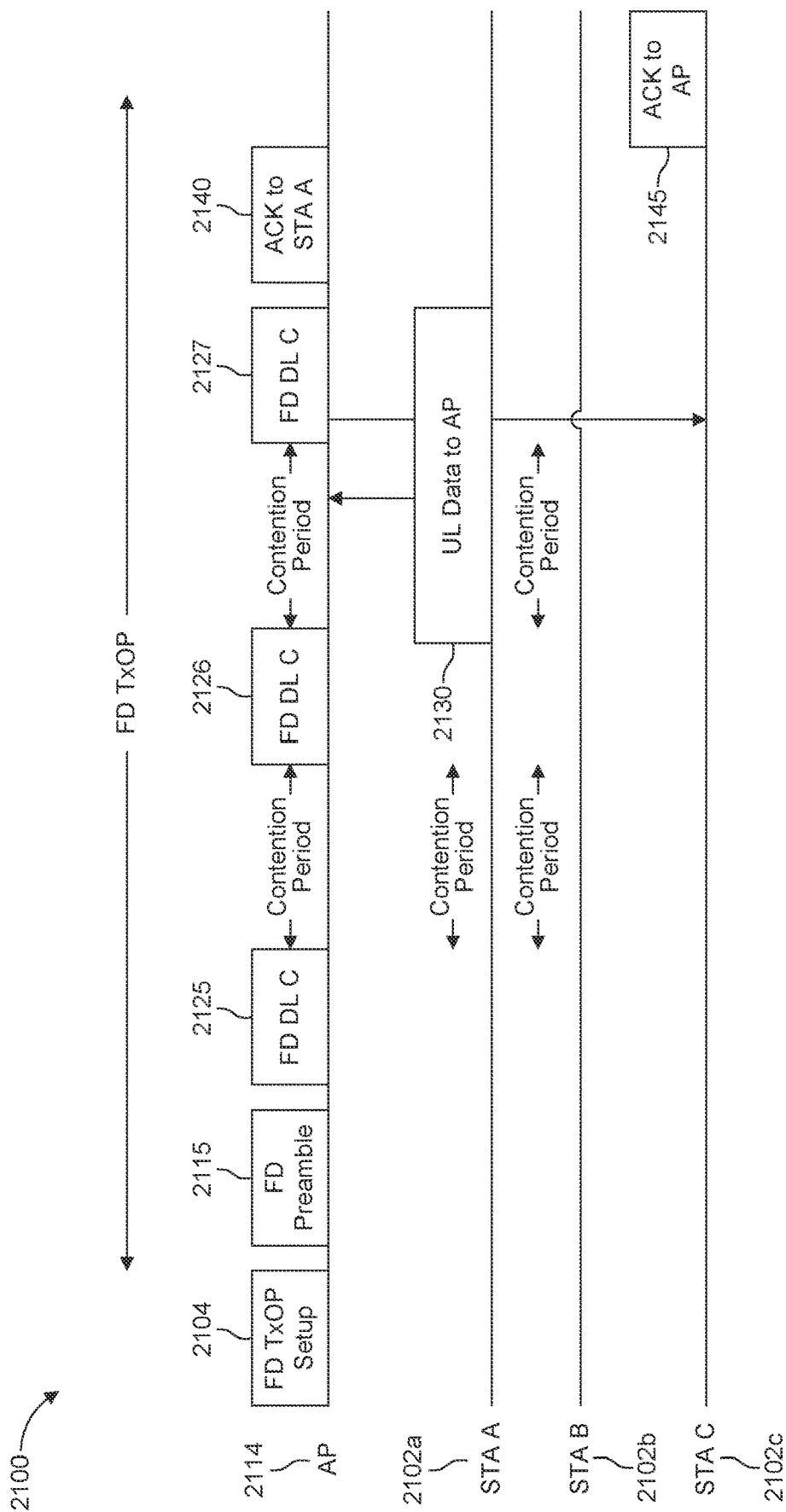
FIG. 21 is a diagram illustrating an example process for opportunistic asymmetric full-duplex uplink transmission for periodic downlink contention periods.

FIG. 21 illustrates an example process 2100 for opportunistic asymmetric full-duplex uplink transmission for periodic DL contention periods, which may be used in combination with any of other embodiments described herein. In this example, multiple contention gaps or contention periods may be initiated at a configurable duration after the commencement of the downlink transmissions 2125, 2126, 2127 to STA C 2102c or a set of configurable durations after the commencement of the downlink transmissions 2125, 2126, 2127 to STA C 2102c. Similar to FIG. 20, during these contention periods, STA A 2002a and STA B 2002b may compete with each other to access the channel. If STA A 2002a obtains the channel access, STA A 2002a may initiate the UL data transmission 2130 to the AP 2114. The UL data transmission 2130 from STA A 2102a may or may not overlap one or more DL data transmissions 2125, 2126, 2127 to STA C 2102c. The contention gaps or contention periods may function as a quiet mid-amble during the downlink transmission. The details of the FD TXOP setup 2104, FD preamble 2115, an ACK 2140 transmitted to STA A 2002a, and a delayed ACK 2145 transmitted to the AP 2114 may be similar to or the same as those described in FIGS. 17, 18, and 19 and are not described in FIG. 21 for brevity.

Figure 22:
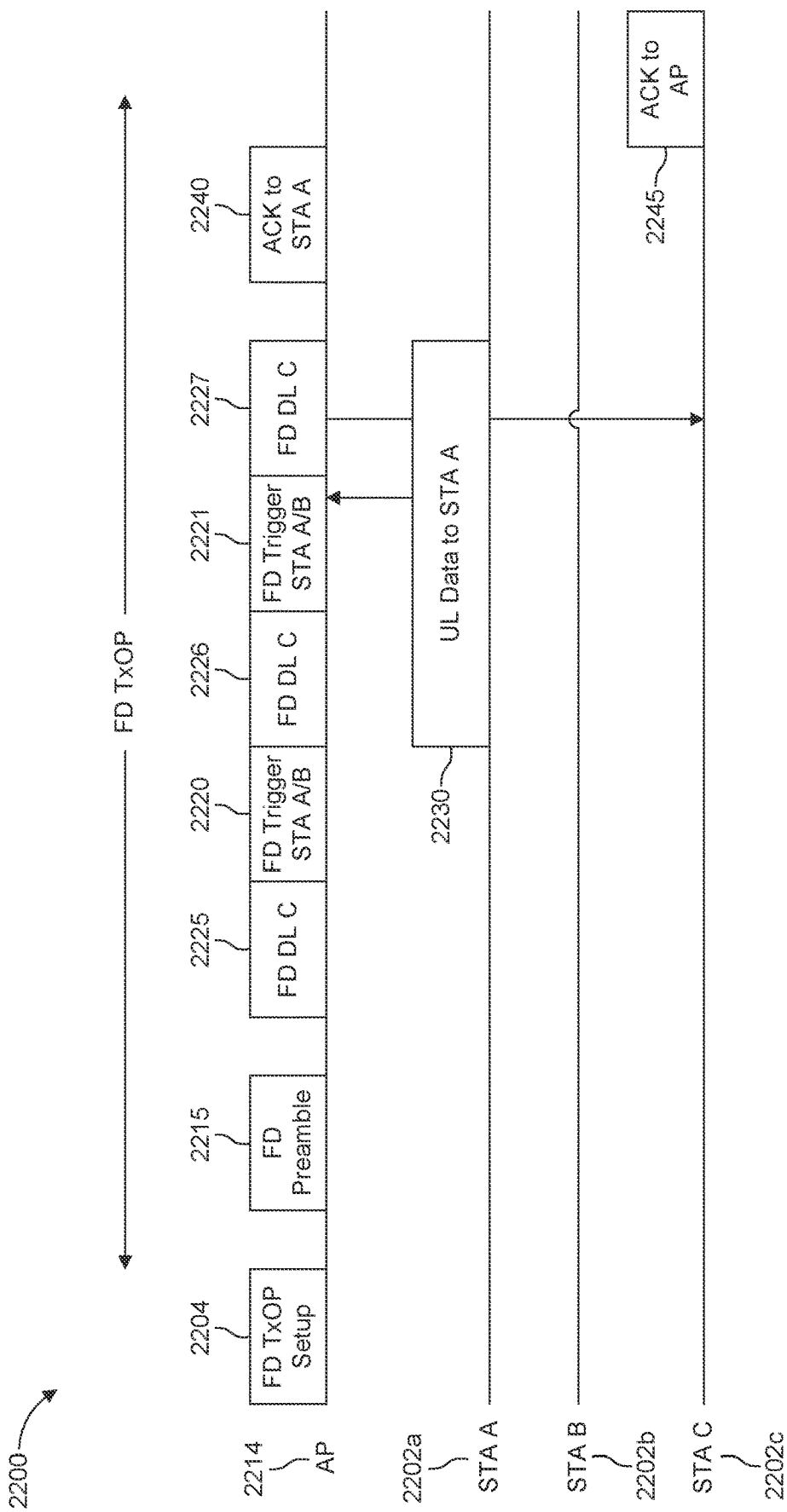
FIG. 22 is a diagram illustrating an example process for opportunistic asymmetric full-duplex uplink transmission for a periodic trigger frame.

FIG. 22 illustrates an example process 2200 for opportunistic asymmetric full-duplex uplink transmission with a periodic trigger frame, which may be used in combination with any of other embodiments described herein. As illustrated in FIG. 22, one or more full-duplex trigger frames 2220, 2221 may be inserted (or transmitted) in multiple DL data transmissions 2225, 2226, 2227. The periodic full-duplex trigger frames 2220, 2221 may be directed to STA A 2202a or STA B 2202b. If STA A 2202a receives the full-duplex trigger frame 2220, STA A 2202a may transmit the UL data 2230 simultaneously until the AP 2214 finishes its DL data transmissions 2225, 2226, 2227 to STA C 2202c. The full-duplex trigger frames 2220, 2221 may schedule specific STAs in specific Resource Units (RUs) or may allow for random access within each RU. The details of the FD TXOP setup 2204, FD preamble 2215, an ACK 2240 transmitted to STA A 2202a, and a delayed ACK 2245 transmitted to the AP 2214 may be similar to or the same as those described in FIGS. 17, 18, and 19 and are not described in FIG. 22 for brevity.

In an embodiment, a procedure for opportunistic asymmetric full-duplex uplink transmission may be used by opportunistic STAs (STA A and STA B). The STAs, STA A and STA B, may receive the full-duplex TXOP setup frame from the AP. The FD TXOP frame may setup the full-duplex TXOP duration. The STAs, STA A and STA B, may receive the full-duplex preamble that is used by the AP to set up the full-duplex filter or full-duplex cancellation circuits (for example, the analog and/or digital cancellation circuits).

The STAs (e.g., STA A, STA B, and STA C) may receive a frame indicating the parameters of the uplink opportunistic transmission. In one example, the frame may identify the STA(s) to receive the downlink transmission, where the STAs that perform opportunistic full-duplex uplink may be implicitly identified. In another example, the frame may identify a single STA or a group of STAs that may access the channel opportunistically, where this group of STAs may be identified, for example, individually by their STA IDs or by a group ID.

The received frame may identify the specific method of opportunistic uplink. In one example, the method may indicate that one or more STAs are allowed specific resources to transmit on. In another example, the method may indicate one or more contention gaps or contention periods for the STAs during which the STAs may contend for the channel, where in the event of multiple contention gaps, the gaps may be periodic or the frame may identify when they will be active (i.e., the timing). In another example, the method may indicate one or more mid-frame full-duplex triggers during which the STA may be assigned to one or more resource units (RUs) within the uplink or may contend for one or more RUs within the uplink; when an RU spans the entire bandwidth, this method may also include the ability to transmit across the entire band.

The received frame for setup may also be sent as a standalone frame, with the full-duplex preamble or may be sent when the downlink transmission is scheduled.

Once the frame is received, STA A and STA B may receive information from the AP identifying that STA C will be receiving a data transmission and the duration of the transmission. Afterwards, STA A and B may send an opportunistic uplink transmission during the DL transmission to STA C based on the specific method that is defined.

Figure 23:
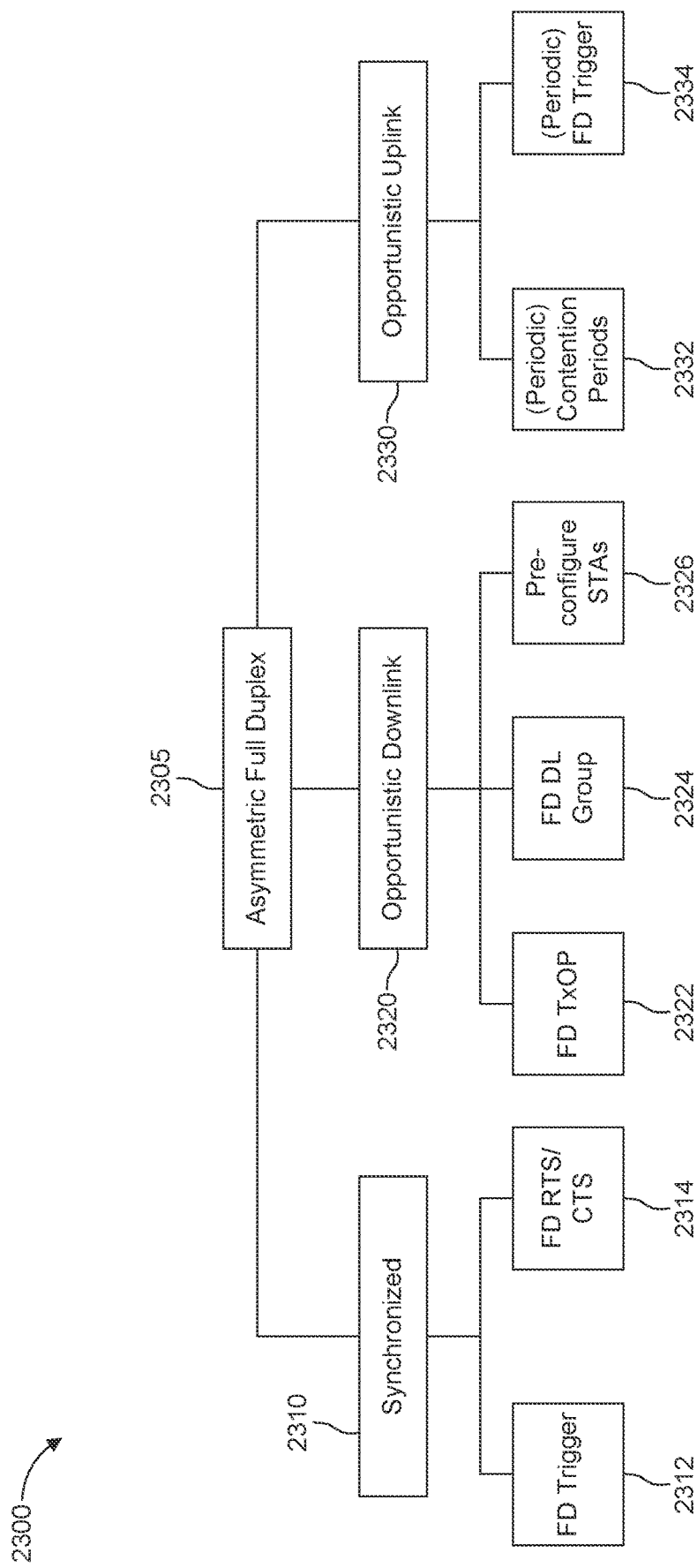
FIG. 23 is a diagram illustrating example taxonomy of channel access schemes for asymmetric full-duplex transmission.

FIG. 23 illustrates an example taxonomy of channel access schemes for asymmetric full-duplex transmission, which may be used in combination with any of other embodiments described herein. As illustrated in FIG. 23, the asymmetric full-duplex transmission 2305 may be categorized as synchronized full-duplex transmission 2310, opportunistic downlink full-duplex transmission 2320, and opportunistic uplink full-duplex transmission 2330. The synchronized full-duplex transmission 2310 may be initiated by an FD trigger frame 2312 or an FD RTS/CTS frames 2314 without the FD trigger frame 2312. The opportunistic downlink full-duplex transmission 2320 may occur during FD TXOP 2322 and based on FD DL group 2324 or STAs that are preconfigured 2326. The opportunistic uplink full-duplex transmission 2330 may be initiated based on periodic contention periods 2332 or periodic FD trigger frames 2334.

In one embodiment, a device or a system may adaptively switch between half-duplex and full-duplex transmission. A full-duplex trigger frame may be used by the AP to enable the system to adaptively switch between half-duplex and full-duplex. In this example, the device or the system may default to a half-duplex transmission system and switch to full-duplex upon receipt or transmission of a full-duplex trigger frame that defines one or more parameters, such as the STA(s) to be transmitted to/from in the full-duplex transmission; the start and end of the full-duplex transmission; the time duration/periodicity of the full-duplex midamble; the time-frequency resources for STA full-duplex preamble transmission, to enable the STA to estimate full-duplex filters for symmetric full-duplex transmissions; and/or the resources assigned to each STA.

For the resources assigned to each STA, in an OFDMA transmission, the full-duplex trigger frame may assign some RU resources as full-duplex or half-duplex depending on transmission conditions (e.g., the traffic available, or the full-duplex filter effectiveness for different resources). In a non-OFDMA transmission, the full-duplex trigger frame may assign channel bands (e.g., on a 5 MHz, 10 MHz, 20 MHz, 40 MHz or 80 MHz granularity) as full-duplex or half-duplex depending on transmission conditions (e.g., the traffic available, or the full-duplex filter effectiveness for different resources).

In an adaptively switching procedure, the STA may receive a full-duplex trigger frame. On receipt of the trigger, the STA may read the receive resource allocation field. If the STA identifies resources for reception, the STA may commence reception of the downlink full-duplex packet at a fixed duration (e.g., a SIFS) from the end of the full-duplex trigger frame.

Also on receipt of the full-duplex trigger frame, the STA may receive the transmit resource allocation field. If the STA identifies resources for transmission, the STA may commence transmission of the uplink full-duplex packet at a fixed duration (e.g., a SIFS) from the end of the full-duplex trigger frame.

Also on receipt of the trigger, the STA may receive the AP full-duplex preamble-midamble field. If a preamble/midamble is identified, the STA may cease transmission/reception for the duration of the pre-amble-midamble field.

For this procedure, if the architecture is a symmetric full-duplex system, the full-duplex trigger may signal time duration for the STA full-duplex preamble transmission.

In one embodiment, there may be procedures for SIG detection based back off. This embodiment may address issues with the unfairness for STA 2 to use a Preamble plus SIG based back off procedure. Such a procedure may be used by STA 2 to determine whether to expect a corrupted packet due to the subsequent full-duplex operation of the AP with STA 1, since prior to initiation of full-duplex operation the AP may coordinate with the STA the parameters for subsequent full-duplex operation using the SIG.

In one procedure a device, such as an AP or STA, may perform a clear channel assessment (CCA) of the medium using a standard half-duplex transmission prior to initiating full-duplex operation. The device may send a RTS to STA 1, and wait for ACK after SIFS. The STA 2 may overhear the preamble plus SIG of the RTS and determine the RTS is for full-duplex operation. The STA 2 may then modify its back-off procedure to use DIFS instead of EIFS for receipt of a corrupted packet In an additional or alternative scenario, the STA 2 may also overhear a CF-Poll frame to determine that full-duplex operation may have begun by the AP with STA 1.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a STA, AP, WTRU, UE, terminal, base station, RNC, or any host computer. Although the solutions described herein consider 802.11 specific protocols, it is understood that the solutions described herein are not restricted to this scenario and are applicable to other wireless systems as well."

What is claimed is:

1. A method for use in a station (STA), the method comprising:
    transmitting, to an access point (AP), a request to send (RTS) frame indicating that the STA has data to send with full-duplex (FD) capability;
    receiving, from the AP, a full-duplex clear to send (FD CTS) frame including an FD preamble, wherein the FD preamble includes training information for FD filter estimation that enables FD communication between the AP and the STA; and
    receiving, from the AP, an FD trigger frame that includes scheduling information for uplink transmission of the data from the STA.

2. The method of claim 1, wherein the scheduling information included in the FD trigger frame includes timing information and channel information for the FD communication, wherein the FD trigger frame is aggregated with a legacy preamble, an FD preamble, and data.

3. The method of claim 1, further comprising:
    transmitting, to the AP, based on the scheduling information, the data for the FD communication with the AP.

4. The method of claim 1, further comprising:
    appending, on a condition that a first packet size of the data is less than a second packet size of another data for downlink transmission from the AP, padding information to the data to the AP to equalize the first packet size of the data to the second packet size of the another data.

5. A station (STA) comprising:
    a transmitter configured to transmit, to an access point (AP), a request to send (RTS) frame indicating that the STA has data to send with full-duplex (FD) capability; and
    a receiver configured to:
    receive, from the AP, a full-duplex clear to send (FD CTS) frame including an FD preamble, wherein the FD preamble includes training information for FD filter estimation that enables FD communication between the AP and the STA; and
    receive, from the AP, an FD trigger frame that includes scheduling information for uplink transmission of the data from the STA.

6. The STA of claim 5, wherein the scheduling information included in the FD trigger frame includes timing information and channel information for the FD communication, wherein the FD trigger frame is aggregated with a legacy preamble, an FD preamble, and data.

7. The STA of claim 5, wherein the transmitter is further configured to transmit, to the AP, based on the scheduling information, the data for the FD communication with the AP.

8. The STA of claim 5, further comprising:
    a processor configured to append, on a condition that a first packet size of the data is less than a second packet size of another data for downlink transmission from the AP, padding information to the data to the AP to equalize the first packet size of the data to the second packet size of the another data.

* * * * *